United States Patent
Namba et al.

(10) Patent No.: US 7,033,269 B2
(45) Date of Patent: Apr. 25, 2006

(54) INPUT METHOD AND APPARATUS FOR A BASEBALL GAME INCLUDING SIMULTANEOUS INPUT OF A DIRECTIONAL INPUT AND SELECTION INPUT FOR A PITCHER'S ACTION

(75) Inventors: Kazuhiro Namba, Amagasaki (JP); Tatsuya Ishikawa, Takarazuka (JP); Hidehisa Takahashi, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 266 days.

(21) Appl. No.: 10/067,123

(22) Filed: Feb. 4, 2002

(65) Prior Publication Data
US 2002/0107058 A1    Aug. 8, 2002

(30) Foreign Application Priority Data
Feb. 8, 2001   (JP)  .............................. 2001-031895

(51) Int. Cl.
*A63F 13/00*   (2006.01)
(52) U.S. Cl. ........................................... 463/3; 463/37
(58) Field of Classification Search .............. 463/3
See application file for complete search history.

(56) References Cited

U.S. PATENT DOCUMENTS

| | | | |
|---|---|---|---|
| 4,324,402 A | | 4/1982 | Klose |
| 4,395,760 A | | 7/1983 | Soski et al. |
| 5,435,554 A | * | 7/1995 | Lipson ........................... 463/3 |
| 5,769,713 A | * | 6/1998 | Katayama ...................... 463/3 |
| 6,045,446 A | | 4/2000 | Ohshima |
| 6,120,374 A | * | 9/2000 | Akada et al. ................... 463/3 |
| 6,183,363 B1 | * | 2/2001 | Ishihara et al. ............... 463/31 |
| 6,244,956 B1 | | 6/2001 | Nakayama et al. |
| 6,257,983 B1 | | 7/2001 | Rimoto |
| 6,270,413 B1 | | 8/2001 | Aikawa et al. |
| 6,292,706 B1 | * | 9/2001 | Birch et al. .................... 700/91 |
| 6,334,813 B1 | * | 1/2002 | Rimoto et al. .................. 463/3 |
| 6,340,332 B1 | * | 1/2002 | Rimoto et al. ................ 463/31 |
| 6,368,210 B1 | | 4/2002 | Toyohara et al. |
| 6,394,894 B1 | * | 5/2002 | Okitsu et al. ................... 463/3 |
| 6,398,647 B1 | * | 6/2002 | Hirai et al. .................... 463/31 |

(Continued)

FOREIGN PATENT DOCUMENTS

EP    0 686 944    12/1995

(Continued)

OTHER PUBLICATIONS

"Triple Play 2000" PC Games: Triple Play 2000 by Electronic Arts. [online]. Mar. 8, 1999, [retrieved on Nov. 18, 2004]. Retrieved from the Internet: <URL: http:pc.ign.com/articles/131/131249p1.html?whreFrom=login>.*

(Continued)

*Primary Examiner*—Julie Brocketti
(74) *Attorney, Agent, or Firm*—Jordan and Hamburg LLP

(57) ABSTRACT

An object of the present invention is to realize a baseball game in an environment that is difficult to achieve in the case of game-dedicated devices and the joysticks used in such devices. When the mouse 22 is moved toward region A, a straight ball is selected as the ball type. When the mouse 22 is moved toward region C, a screwball is selected. When the mouse 22 is moved toward region D, a sinker is selected. When the mouse 22 is moved toward region E, a split-fingered ball is selected. When the mouse 22 is moved toward region G, a slider is selected.

11 Claims, 19 Drawing Sheets

U.S. PATENT DOCUMENTS

| | | |
|---|---|---|
| 6,482,090 B1 | 11/2002 | Rimoto et al. |
| 6,527,637 B1 | 3/2003 | Fujioka et al. |
| 2001/0005689 A1 | 6/2001 | Fujioka et al. |
| 2001/0006908 A1 | 7/2001 | Fujioka et al. |
| 2001/0008846 A1 | 7/2001 | Yamauchi et al. |
| 2001/0027130 A1 | 10/2001 | Namba et al. |
| 2002/0103016 A1 | 8/2002 | Namba et al. |
| 2003/0017863 A1 | 1/2003 | Takahashi et al. |
| 2003/0022707 A1 | 1/2003 | Namba et al. |

FOREIGN PATENT DOCUMENTS

| | | |
|---|---|---|
| EP | 0916376 | 5/1999 |
| EP | 0972549 | 1/2000 |
| EP | 1 060 769 | 12/2000 |
| EP | 1072299 | 1/2001 |
| EP | 1 113 639 | 7/2001 |
| JP | 7-21007 | 1/1995 |
| JP | 10-52572 | 2/1998 |
| JP | 2000-317140 | 11/2000 |
| JP | 2000-325654 | 11/2000 |
| JP | 2001-198351 | 7/2001 |
| WO | WO 98/14898 | 4/1998 |

OTHER PUBLICATIONS

"Triple Play 2001 Cheats" [online]. Mar. 25, 2000, retrieved on Jun. 7, 2005. Retrieved from the Internet: <URL:http://www.cheats.gamespy.com/pc-cheats/triple-play-2001>.*

FKrueger. "Triple Play 2000" Game Over Online Magazine. [online]. Mar. 31, 1999, retrieved on Jun. 1, 2005. Retrieved from the Internet: <URL:http://www.game-over.net/reviews.php?id=130&page=reviews>.*

"Triple Play Baseball" Manual. 2000. EA Sports, Redwood City, CA.*

"Triple Play 2001" Manual. EA Sports, Redwood City, CA.*

Pages 7, 20 and 41 of "1997 opening game version of powerful professional baseball game in the real situation, official perfect guidance book", Konami Corporation, newly revised on Apr. 1, 1998.

* cited by examiner

INPUT METHOD AND APPARATUS FOR A BASEBALL GAME INCLUDING SIMULTANEOUS INPUT OF A DIRECTIONAL INPUT AND SELECTION INPUT FOR A PITCHER'S ACTION

BACKGROUND OF THE INVENTION

1. Field of the Invention

The present invention relates to a computer readable recording medium, a game progress control program, a game server, and a game progress control method.

2. Description of the Related Art

In recent years, the playing of competitive games such as tennis, soccer, baseball and the like on the monitors of programmed computers has been widely practiced. The content of the competition varies; however, in almost all of these games, a player (also referred to as a game player) ordinarily controls the actions of a player character using an operating unit, and the player is given a score on the basis of how appropriately the player character acts with respect to a ball put into play by the computer device or by a competitor character operated by a competitor. For example, in the case of a baseball game, the basis of the operation is how the pitcher character constituting the player character pitches the ball so that the ball is not hit by the batter character constituting the competitor character; as a result, the criterion for scoring is the question of whether or not the ball is hit by the batter character.

The content of the operations performed by the player in this case comprises mainly the determination of the type of ball pitched by the pitcher character, the speed of the ball, the course of the pitch and the like. Ordinarily, an operating unit connected to the computer device proper is used in order to realize such operations. This operating unit is generally arranged so that arbitrary coordinate positions in two dimensions are specified by detecting the amounts of displacement of the player's operation in the direction of the X coordinate and the direction of the Y coordinate, and the specified coordinate positions are transmitted to the computer device proper. The course of the pitch and the like are realized by specifying such coordinate positions. Furthermore, the system is arranged so that timing signals are generated by pressing a switch at arbitrary points in time, and these timing signals are transmitted to the computer device proper. The timing of the initiation of the pitching motion is determined by such timing signals.

Computer devices can be divided into two main categories, i. e., computer devices specifically devised for game use, such as game-dedicated devices, and computer devices that can be used in a broad range of applications, such as personal computers. In the case of the former devices, an analog joystick or digital joystick, or a controller mounting such joysticks, is used as the operating unit. In an analog joystick, sensors that output the X coordinate and Y coordinate as analog values are disposed in the base end part of a projecting body of a specified size. By tilting this projecting body with the fingers, the player can designate arbitrary coordinate positions in a two-dimensional region in accordance with the amount of inclination. Furthermore, in the case of digital joysticks, cross-shape keys which have sensors (or switches) that are used to produce coordinates in the upward, downward, left and right directions constitutes the mainstream; in this case, the player can designate arbitrary coordinate positions in a two-dimensional region by continuing to press one cross-shape key, or by continuing to press two cross-shape keys simultaneously.

On the other hand, a pointing device such as a mouse, portable tracking ball, portable slide pad or the like is generally used as the operating unit of a personal computer. Among these pointing devices, both a mouse and a portable tracking ball have a pair of sensors which detect the respective amounts of displacement of the X coordinate and the Y coordinate, and a ball body which is used to drive both sensors simultaneously; these devices are arranged so that coordinate positions in a two-dimensional region can be designated by the player rolling the ball body in the target direction, either directly with the hand or indirectly via a disk surface. A slide pad has a contact position for human fingers and a sensor, which detects the direction of movement and amount of movement; such a slide pad is arranged so that arbitrary coordinate positions in a two-dimensional region can be designated on the basis of the detection results of the sensor. In principle, a combination with a mouse or the like can be realized by a digital method.

The main difference between the operating unit of a game-dedicated device and that of a personal computer lies in the handling of the pointer. Specifically, in the case of the operating unit of a game-dedicated device, data corresponding to the pointer (hereafter referred to as a "virtual pointer") is present inside the device. Since this virtual pointer is displaced as long as the player continues to press the projecting body or cross-shape keys, the virtual pointer is a tool that is superior to a mouse or the like in terms of operability in cases where the pointer is merely displaced by an approximate amount in the desired direction and quickly returned to the home position. However, data that is input by means of a joystick is only data that relates to the direction of displacement; the amount of displacement of the virtual pointer depends exclusively on the input time. On the other hand, data that is input by means of a mouse or the like is data that relates to the direction of displacement and amount of displacement, so that the direction of displacement and amount of displacement of the pointer can be input in a single operation regardless of the length of the input time. Accordingly, in the case of application to games which require displacement of the pointer to random positions at a high speed, and subsequent actions at the displaced position, it may be said that a mouse or the like is superior to the respective joysticks.

Currently, game-dedicated devices are more the mainstream of computer devices used for games than personal computers, and game programs also have a content that envisions operation by the operating unit of a game-dedicated device. In the case of game-dedicated devices, however, it is difficult to realize a game, which requires accurate displacement of the pointer to random positions at a high speed and subsequent actions at the displaced position as described above. Furthermore, in the case of game-dedicated devices, only the person who purchases the device can play the game; this hinders the realization of a game that allows wide participation by numerous persons. On the other hand, all-purpose computer devices such as personal computers have a wide user stratum, and also allow a wider range of utilization than game-dedicated devices in terms of communications infrastructure such as networks.

SUMMARY OF THE INVENTION

In view of the above, an object of the present invention is to provide a game progress control program, a game server and a game progress control method which allow the realization of a baseball game in an environment that is difficult to achieve in the case of game-dedicated devices and joysticks used in such devices.

In order to achieve the object of the invention, according to the invention, a computer readable recording medium in which a game progress control program is recorded to control a progress of a baseball game in which a game player's team and a computer-controlled team or competitor's team alternately play offense and defense via a ball character used as a game medium, comprises the steps of: displaying a game image including a plurality of characters on a monitor screen of a computer; receiving input of the content of instructions based on the moving operations and button operations of the player with respect to a pointing device; and proceeding the baseball game based on the input made by the game player; wherein in said receiving step, the designation of instructions for the pitching action of a pitcher character is accomplished by the operation of said pointing device when the player's team is the defensive side, the designation of instructions for the offensive action of a batter character is accomplished by the operation of said pointing device when the game player's team is the offensive side, and the selection of pitching or pickoff throw as said pitching action is accomplished by a button operation of said pointing device.

These and other objects, features and advantages of the present invention will become more apparent upon reading the following detailed description along with the accompanied drawings.

DESCRIPTION OF THE PREFERRED EMBODIMENTS

Figure 1:
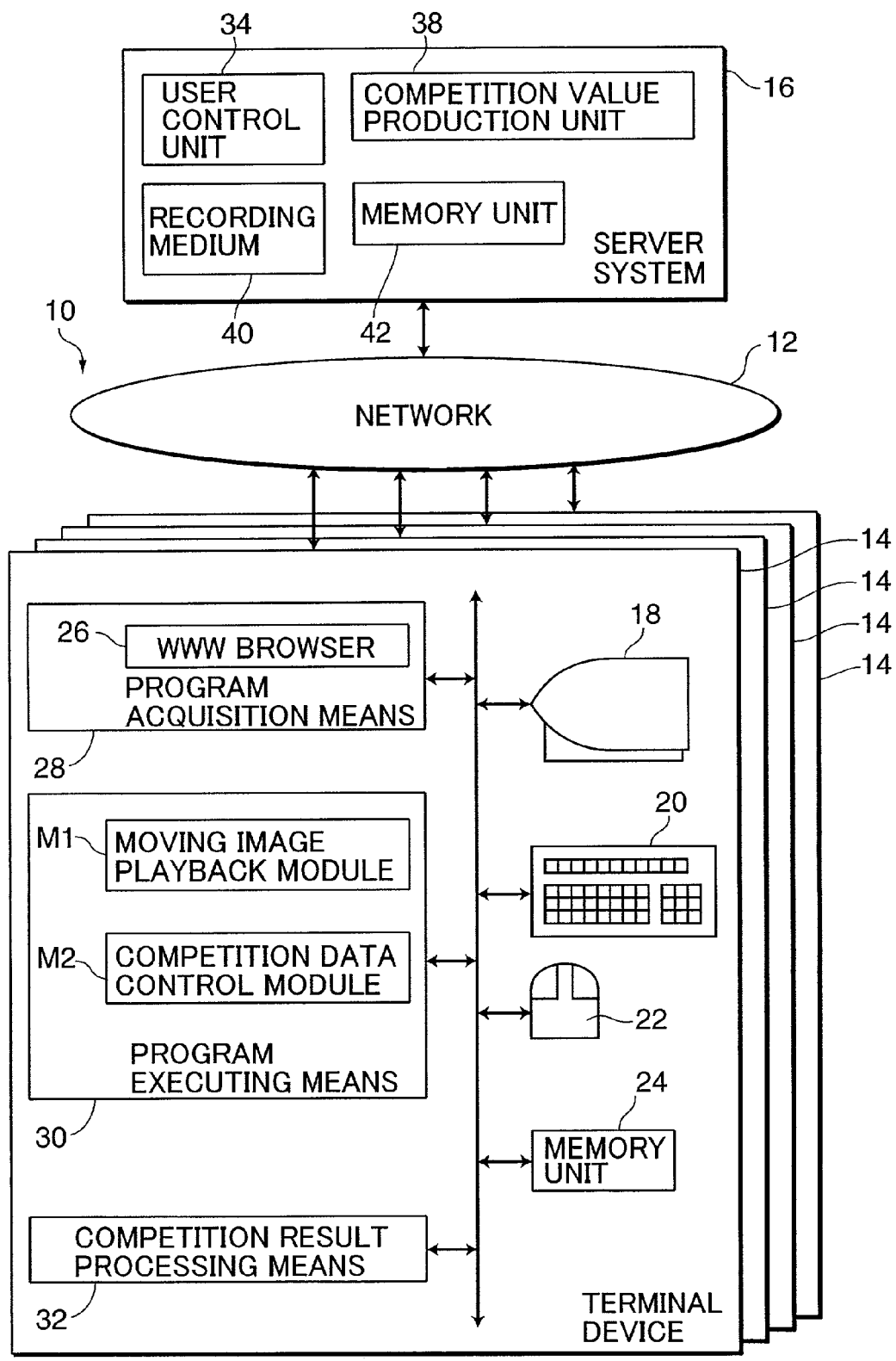
FIG. 1 is a structural diagram of a game system to which a game progress control method constituting one embodiment of the present invention has been applied.

FIG. 1 is a structural diagram of a game system 10 to which a game progress control method constituting one embodiment of the present invention has been applied. In this figure, the game system 10 is constructed so that this system includes a plurality of personal computers 14 which are terminal devices that are connected to the Internet 12, and a server system 16. Furthermore, in the present embodiment, a case is described in which the present invention is applied to a baseball game which is a competitive game that is performed with players (game players) using the personal computers 14 (hereafter referred to as "computers 14") participating at arbitrary times via the internet 12.

A display 18, keyboard 20, mouse 22 and memory unit 24 consisting of a RAM or the like is connected to each computer 14; each computer 14 has a net connection tool that allows connection to the internet 12, and a WWW browser 26 is built into each computer 14. In the present embodiment, each computer 14 is equipped with program acquisition means 28, program executing means 30 and competition result processing means 32 in order to realize a baseball game.

The program acquisition means 28 acquire a specified competition program (baseball game program) from a page screen provided by the server system 16 following initial registration with respect to the server system 16, and develop this program in a memory region belonging to the program acquisition means 28. A functional module for program acquisition may be independently prepared; more simply, however, a competition program may be acquired from a page screen of the server system 16 using the function of the WWW browser 26 "as is". Furthermore, the system may be arranged so that this competition program is acquired by the computer 14 from the server system 16 each time that the game is played, or so that the competition program is acquired only at the time of initial registration, and is subsequently stored in the computer 14. Alternatively, a configuration in which the competition program is installed in the computer 14 beforehand may also be used. In this case, there is no need for any program acquisition means 28.

The competition program referred to here is constructed from a moving image playback module M1 and a competition data control module M2. A configuration in which both modules are present in the server system 16 as integral units is desirable; however, a configuration in which the respective modules are dispersed in other server systems may also be used. In the former case, a single URL is noted on the page screen provided by the server system 16, and the system is devised so that the user can automatically acquire all of the modules by designating this URL. In the latter case, URLs for the respective modules are noted on the page screen of the server system 16, and the system is devised so that the user can indirectly acquire all of the modules.

The moving image playback module M1 plays back three-dimensional moving images. For example, "Shock Wave" produced by Macromedia Co., which has become popular on the Internet, can be utilized for this module. The competition data control module M2 controls the original data of the moving images played back by the moving image playback module M1, and various types of data used to develop the story of the competition. In the present embodiment, image data, sound data, text data and the like relating to the pitcher character, batter character, ball character (as one example of a flying object) and shadow, meet cursor (which constitutes the capture point), strike zone, respective bases, home base and background features such as stands and the like which are necessary in order to realize a baseball game are controlled in accordance with the competition rules. Furthermore, the respective image data are regulated as coordinate data on the game space. Moreover, among the various types of data, at least the image data is controlled so that one display image is formed by a plurality of layers. Specifically, the system is arranged so that the configurations of expressions such as the movements of characters and the like can be varied for each layer. In the case of a control configuration based on such a plurality of layers, an advantage is obtained in that the quantity of original data in the case of moving image playback can be reduced.

The program executing means 30 generate various events relating to a baseball game by executing programs in other modules centering on the program of the competition data control module M2, and produce the results of these events by calculation. In concrete terms, the competition data control module M2 and the like are dropped into the WWW browser 26, and various events are generated by running the programs using the CGI. The display of images and text used for competition is all accomplished on the browser screen, and the transmission of information between the server system 16 and player is all accomplished via the WWW browser 26 and the CGI of the server system 16. The competition result processing means 32 perform processing relating to the results of the baseball game in cooperation with the competition data control module M2 and the like; in concrete terms, these means perform two-way communication with the server system 16, and provide information to the player.

Furthermore, as was described above, the program executing means 30 and competition result processing means 32 can be realized by the computer 14 using the WWW browser 26 and modules acquired from the server system 16; however, it would also be possible to use a configuration in which a program code for realizing all or part of the functions is recorded in advance on a conveying medium which can be specified in the form of a "signal" or a recording medium such as a CD-ROM or the like, and this program code is appropriately downloaded (or installed) in the computer 14 before the baseball game is played.

Furthermore, in addition to the basic server function of providing a page screen to the respective computers 14, the server system 16 also has the functions of a user control unit 34 and a competition value production unit 38. These functions are formed by a program code, which is recorded in a form that can be read by the CPU of the server system 16. Furthermore, the server system 16 has a memory storage medium (also referred to as a recording medium) 40 consisting of a CD-ROM, hard disk or the like which stores competition programs and the like that are provided via the internet 12 in response to requests from the player, and a memory unit 42 consisting of a RAM or the like which stores data transmitted from the respective computers 14.

The user control unit 34 controls user-specific information that is accessed via the page screen, and cumulative values and statistical values of the baseball game results, for each player. If necessary, furthermore, this user control unit also has the function of performing a security check for access. The competition value production unit 38 produces incentive information with respect to the baseball game results (number of home runs, batting average, earned run average (ERA), number of strike-outs (K) and the like) for each player. Here, the term "incentive information" refers to information, which is used to give the players an incentive for continuing the competition; various types of information are conceivable. Examples of such information include information concerning goods or corresponding value information which is provided to players who satisfy conditions specified by the sponsor of the competition, as well as key words which allow free access to site ordinarily requiring a fee for access or the like. This incentive information can be set in stages. In this case, in the most initial stage, a ranking is made in order to inform a given player how the competitive ability of this player is ranked compared to the competitive abilities of other players, and a specified display of incentives at each stage is performed for this player.

Next, the procedure used in cases where a baseball game is actually played using the system will be described on the basis of the flow chart shown in FIG. 2, with reference to the explanatory diagram of the operating method of the pointing device such as a mouse or the like shown in FIGS. 4 and 15, and the display screens shown in FIG. 3, FIGS. 5 through 13, and FIGS. 16 through 19. In this baseball game, in the present embodiment, the player's team competes for a maximum of nine innings (i. e., with the same player alternately repeating offense and defense) with a computer-controlled team (hereafter referred to as a "computer team") or the team of another player, and the ranking of the player's team with respect to the teams of other players playing the same baseball game via the internet 12 is determined on the basis of the cumulative value of the winning score of the player's team relative to the computer team (or other player's team) at the point in time at which the game ends. This winning score is the difference between the score of the player's team and the score of the computer team; for example, in a case where the score of the player's team is 5 and the score of the computer team (or other player's team) is 3, the winning score is "+2", while in a case where the score of the player's team is 3 and the score of the computer team (or other player's team) is 5, the winning score is "−2".

Furthermore, in a case where the player's team is the offensive side, the player operates the batting action of the batter using the pointing device such as a mouse or the like, and the movements of the runners and the like are automatically processed according to baseball rules. In a case where the player's team is the defensive side, the player operates the pitching action of the pitcher using the pointing device such as a mouse or the like, and the actions of the other player characters such as outfielders and the like are automatically processed according to baseball rules. Furthermore, the reason that a pointing device such as a mouse or the like is used is that this allows the input of the direction of displacement and amount of displacement of the pointer displayed on the monitor 18 by a single operation, and takes into account the fact that even an inexperienced player can easily displace the pointer to random positions at a high speed, and the fact that such pointing devices have become most popular with players using personal computers. In the following description, a case in which the player's team is the defensive side will be described.

Figure 2:
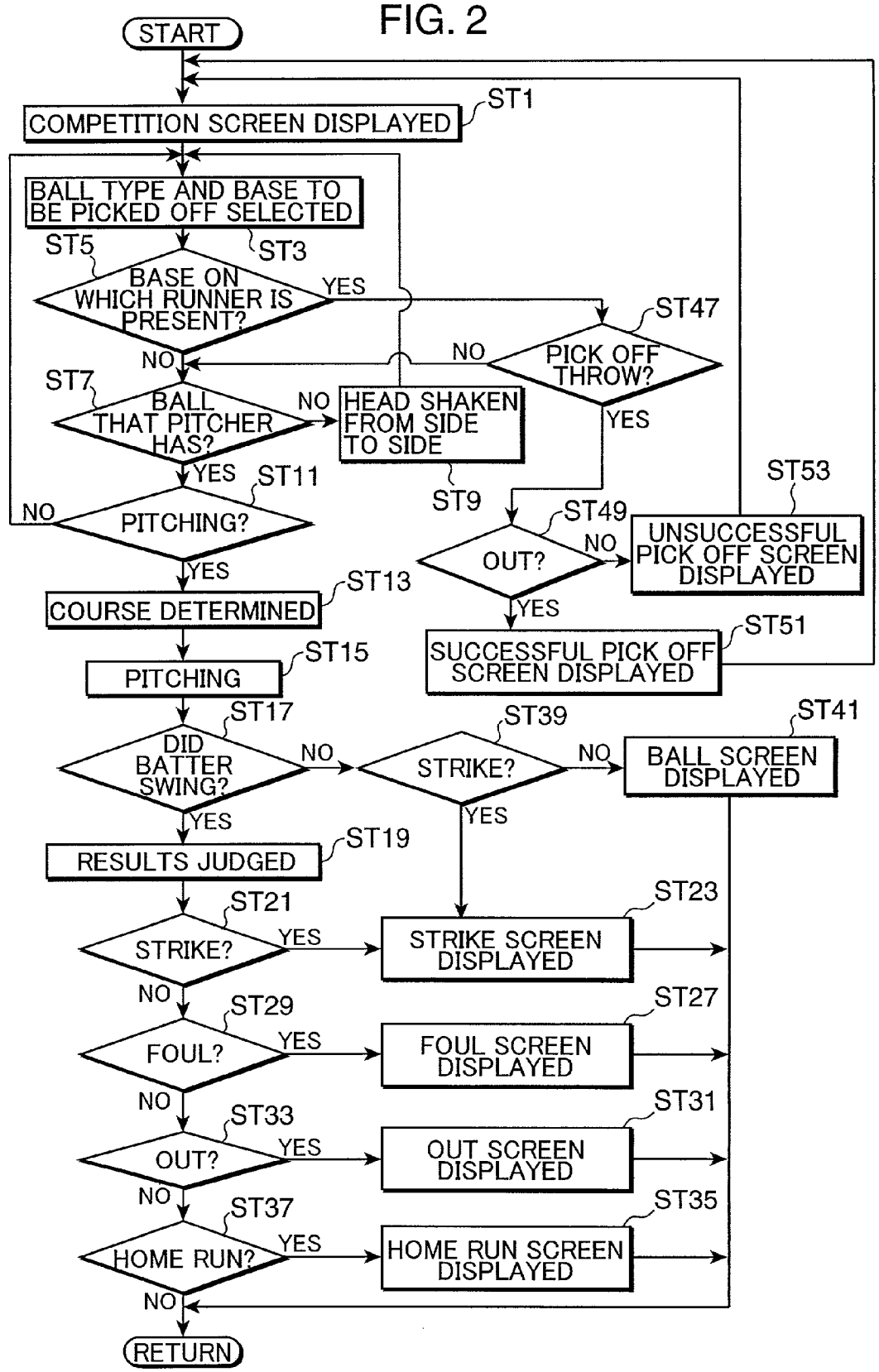
FIG. 2 is a flow chart, which is used to illustrate the operation of the game system.
Figure 3:
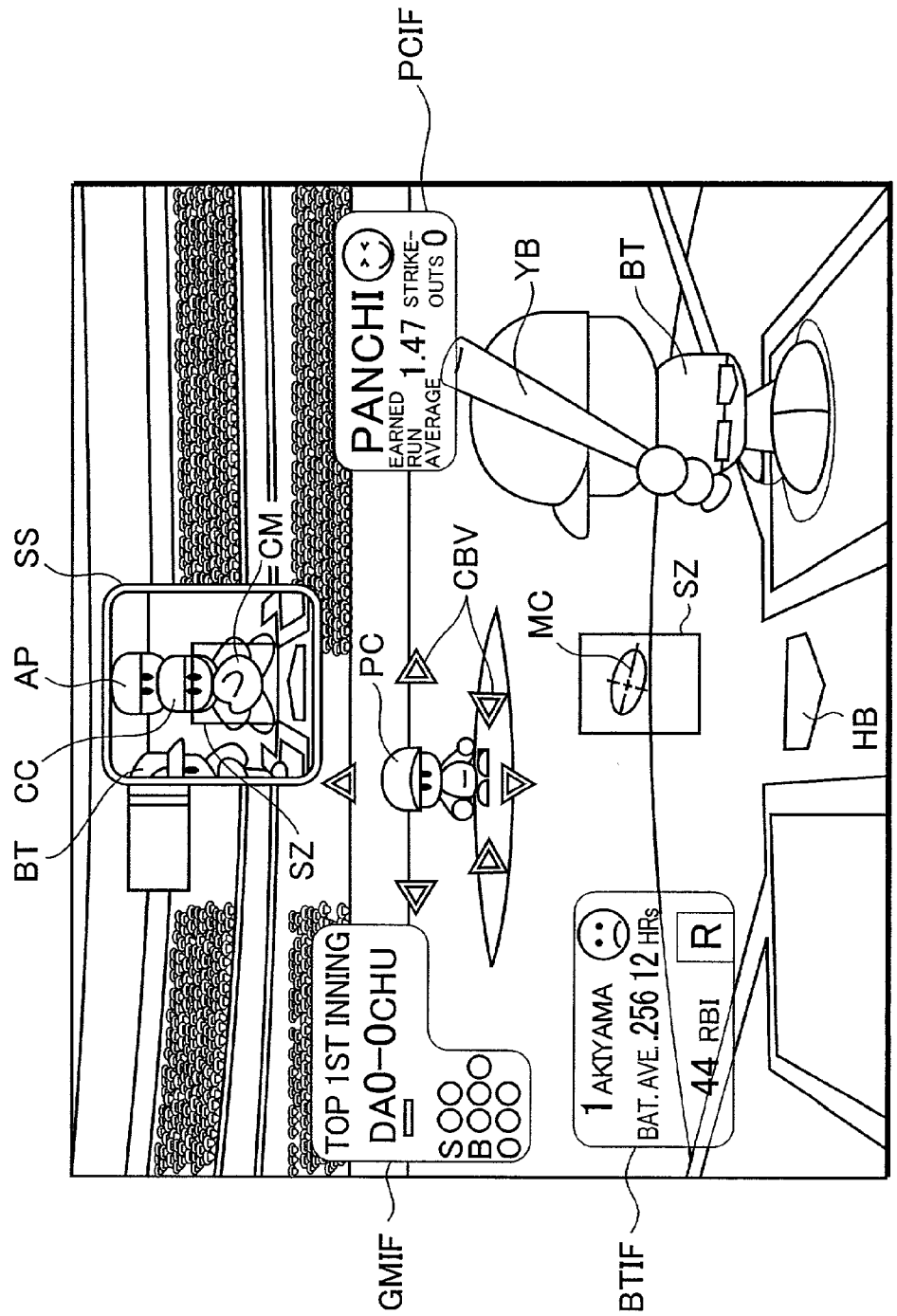
FIG. 3 shows the competition screen that is displayed on the monitor of the game system.
Figure 4:
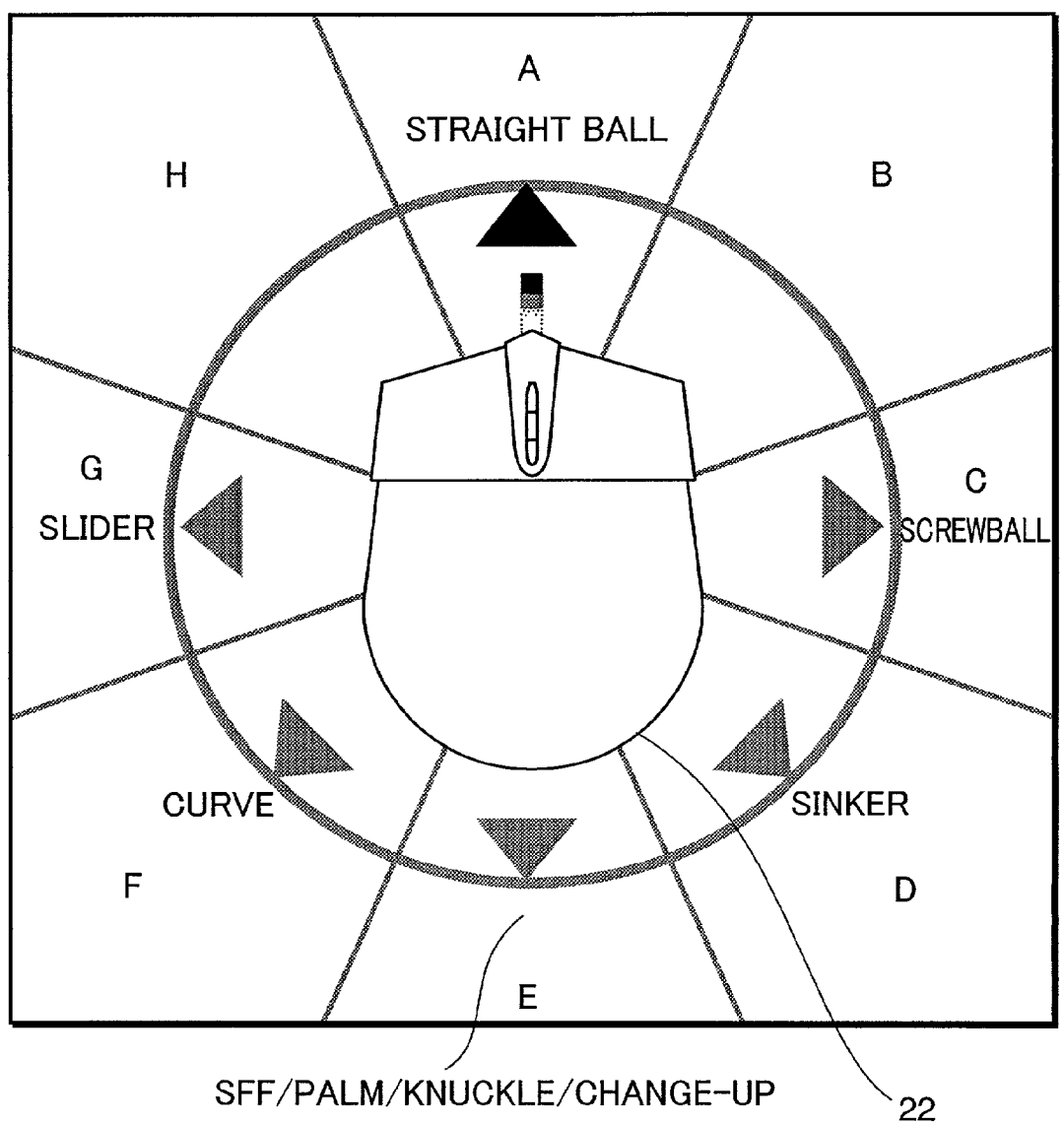
FIG. 4 is an explanatory diagram of the operating method used to select the ball type by means of the pointing device.

In the flow chart shown in FIG. 2, a competition screen such as that shown in FIG. 3 is first displayed on the monitor 18 (ST1). In this competition screen shown in FIG. 3, the pitcher character PC of the player's team is displayed in the center of the screen, and the batter character BT (holding the bat character YB) of the computer team (or other player's team) is displayed on the batter's box. Ball type and picked off base selection arrows CBV which are used in the selection of the ball type in the case of pitching and the selection of the base that is to be picked off in the case of pickoff throw (either first base, second base or third base) are displayed around the pitcher character PC. Furthermore, a strike zone SZ is displayed above home base HB. Moreover, a meet cursor MC which is operated by the computer (or other player) is also displayed above home base HB. A small screen SS, which shows the side of the batter character BT as seen from the side of the pitcher character PC is displayed in the upper central portion of the screen. The batter character BT, an umpire character AP, a catcher character CC and a catcher's mitt character CM worn by the catcher character CC are displayed in this small screen SS. Furthermore, the name, ERA and the like of the pitcher character, which constitute information PCIF concerning the pitcher character PC, are displayed to the right of the pitcher character PC. Moreover, the name, batting average and the like of the batter character BT, which constitute information BTIF concerning the batter character BT, are displayed on the lower left portion of the screen. The strike count, ball count, out count and the like, which constitute information GMIF concerning the game currently being played, are displayed on the left central portion of the screen. Furthermore, the strike count, ball count and out count are respective counted by a strike counter, ball counter and out counter.

Next, operations that select the "ball type" and the "base that is to be picked off (first base, second base or third base)" are performed by the player using the pointing device such as a mouse or the like (ST3). First, the operating method used to select the "ball type" by means of the pointing device will be described with reference to FIG. 4. FIG. 4 is a view of the mouse 22 as seen from directly above; the mouse 22 is depicted in the center of the figure. The mouse 22 can be moved in any direction on the plane on which the mouse is placed; this plane is divided into eight regions A through H.

When the mouse 22 is moved toward region A, a "straight ball" is selected as the ball type. When the mouse 22 is moved toward region C, a "screwball" is selected as the ball type. When the mouse 22 is moved toward region D, a "sinker" is selected as the ball type. When the mouse 22 is move toward region E, a ball type that is currently set as a "ball type that can be selected" for the currently selected pitcher character PC is selected as the ball type from a set comprising a "split-fingered ball(SFF)", "knuckle" and "change-up". Here, the "ball types that can be selected" for the pitcher character PC are set beforehand as one of the ability parameters for each pitcher character PC. Accordingly, if a change in the pitcher character PC, i. e., a pitcher alternation (details of the screen, operating method and the like are omitted) is performed by the player, the "ball types that can be selected" can be updated from the "ball types that can be selected" set for the previously selected pitcher character PC to the "ball types that can be selected" set for the currently selected pitcher character PC. Furthermore, the values of the "ball types that can be selected" are set so that there is not a plurality of different ball types contained as "ball types that can be selected" in the same region.

When the mouse 22 is moved toward region F, a "curve" is selected as the ball type. When the mouse 22 is moved toward region G, a "slider" is selected as the ball type. Furthermore, when the mouse 22 is moved toward region B or region H, no ball type is selected. Here, the initial ball type prior to the ball type selection operation is a "slow ball". Accordingly, in cases where the player performs the pitching operation of step ST11 without selecting a ball type, the ball type is a "slow ball".

Figure 14:
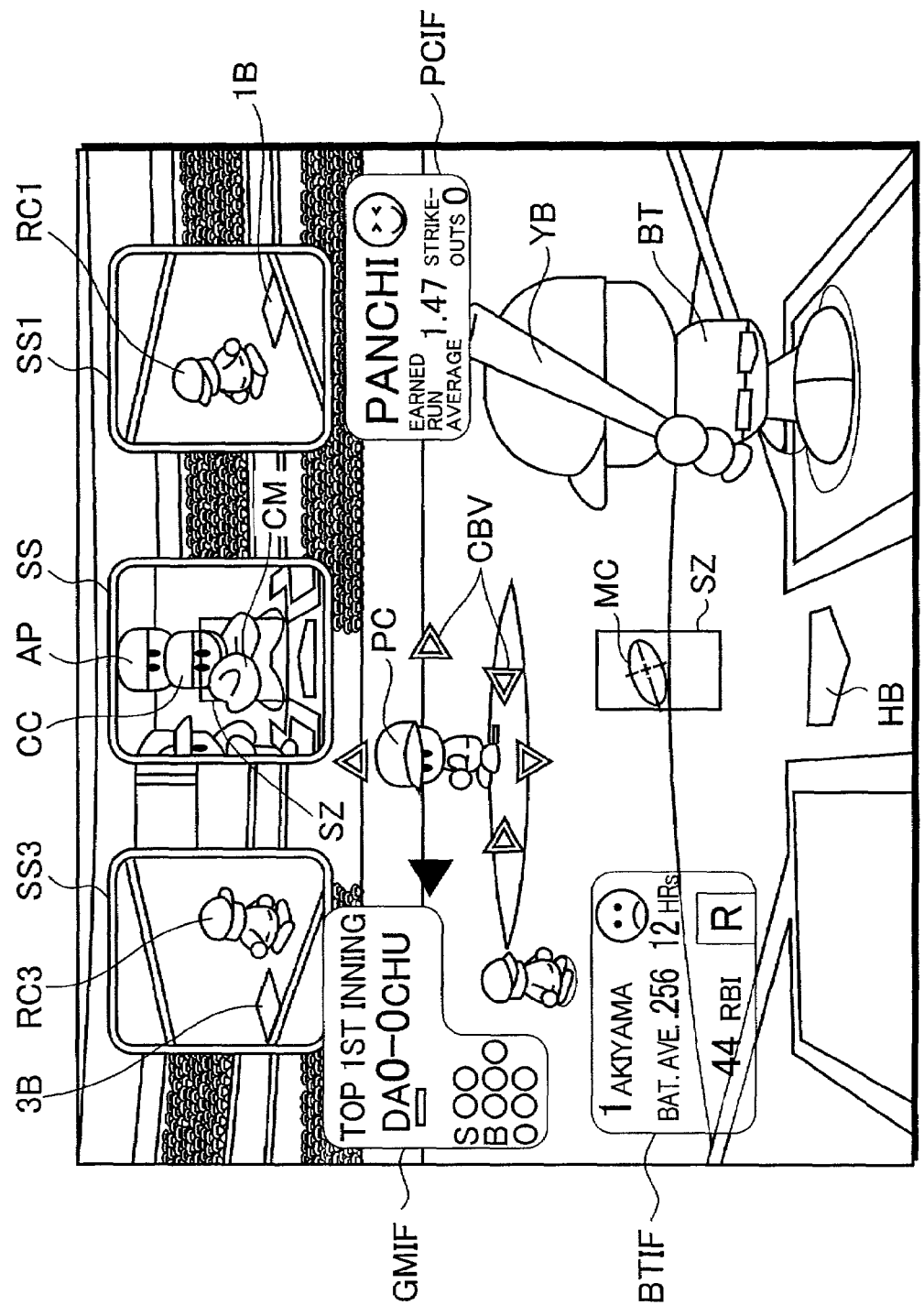
FIG. 14 shows the competition screen that is displayed on the monitor of the game system.

Next, the operating method used to select the "base that is the object of pickoff throw" by means of the pointing device will be described with reference to FIGS. 14 and 15. FIG. 14 is the competition screen that is displayed in a case where there are runners on first base and third base. In this competition screen, as is shown in FIG. 14, a small screen SS1 which includes the first base runner character RC1 and first base 1B, and a small screen SS3 which includes the third base runner character RC3 and third base 3B, are displayed. FIG. 15 is an explanatory diagram of the operating method used to select the base that is the object of pickoff throw by means of the pointing device.

Figure 15:
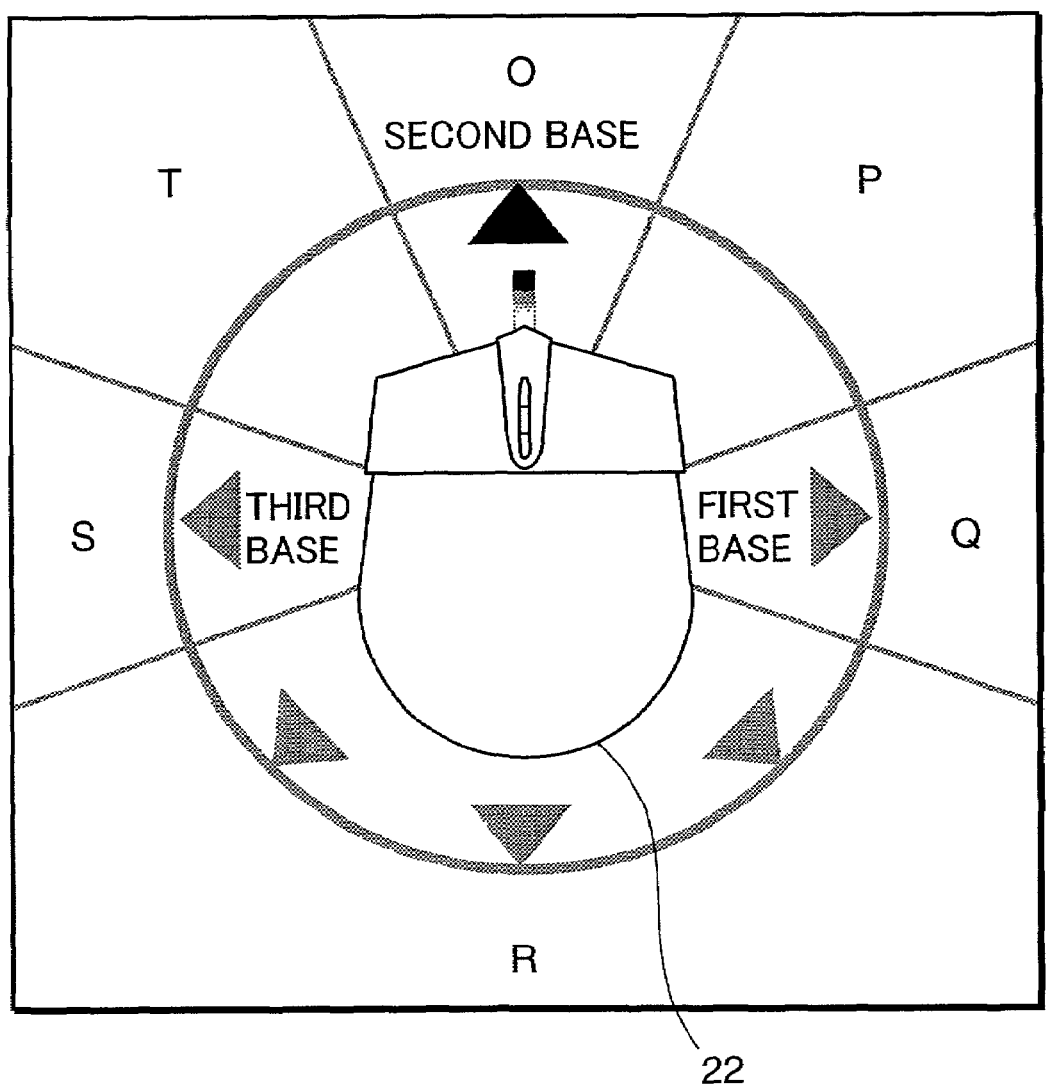
FIG. 15 is an explanatory diagram of the operating method used to select the base that is the object of pickoff throw by means of the pointing device.

FIG. 15 is a view of the mouse 22 from directly above; the mouse 22 is depicted in the center of this figure. The mouse 22 can be moved in any direction on the plane on which the mouse is placed; this plane is divided into five regions O through T. When the mouse 22 is moved toward region Q, first base is selected as the base that is the object of pickoff throw. When the mouse 22 is moved toward region O, second base is selected as the base that is the object of pickoff throw. When the mouse 22 is moved toward region S, third base is selected as the base that is the object of pickoff throw. When the mouse 22 is moved toward a region other than the (O, Q, S), no base is selected as an object of pickoff throw.

Furthermore, in the above description, the selection of the "ball type" and the selection of the "base that is the object of pickoff throw" were described separately for convenience; however, these selections are performed simultaneously by the moving operation of the pointing device such as a mouse or the like. Specifically, for example, when the mouse is moved toward the left side as seen from above, a "slider" is selected as the "ball type", and "third base" is selected as the "base that is the object of pickoff throw".

Next, a judgment is made as to whether or not there is a runner on the base that has been selected in step ST3 (ST5). In cases where there is no runner, the processing proceeds to step ST7. In cases where there is a runner, the arrow among the ball type and picked off base selection arrows CBV that corresponds to the base in question shows an alteration of the display (color, pattern, flashing or the like), and the processing proceeds to step ST47. For example, in a case where third base is selected, the left arrow among the ball type and pickoff base selection arrows CBV shows an alteration of the display (color, pattern, flashing or the like) as shown in FIG. 14 if there is a runner on third base.

Figure 5:
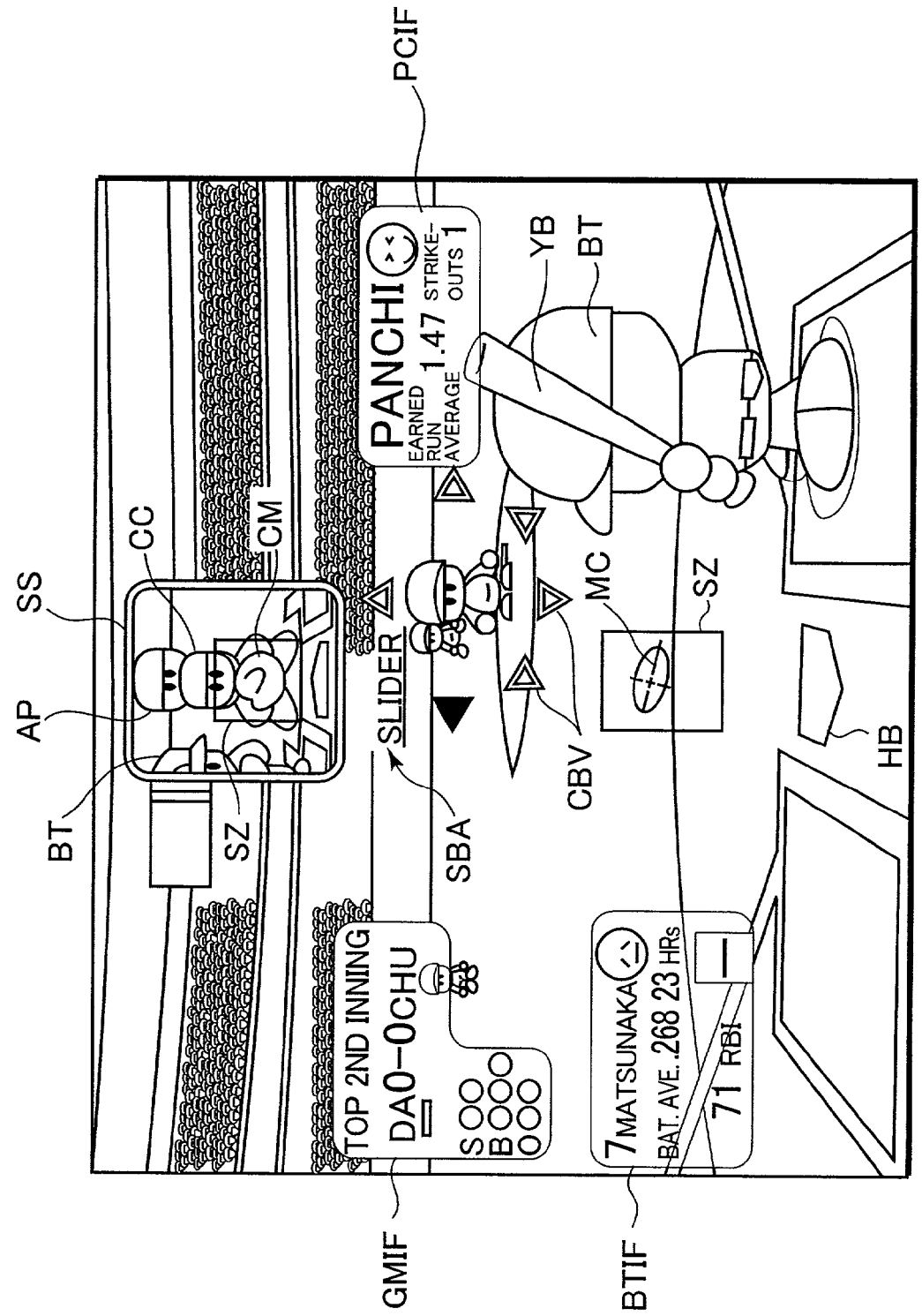
FIG. 5 shows the competition screen that is displayed on the monitor of the game system.

Then, a judgment is made as to whether or not the ball type selected by the player in step ST3 is included in the "ball types that can be selected" set for the current pitcher character PC (i. e., as to whether or not this ball type is a "ball that the pitcher has") (ST7). Furthermore, the processing of step ST7 is processing that is performed both in cases where it is judged that a runner is present on the base selected in step ST3, and in cases where it is judged that a runner is not present. In cases where the ball type in question is not included in the "ball types that can be selected", a screen display (not shown in the figures) in which the pitcher character PC shakes his head from side to side is performed (ST9), and the processing returns to step ST3. In cases where the ball type in question is included in the "ball types that can be selected", the ball type screen shown in FIG. 5 is displayed. Here, a case in which the mouse 22 is moved toward region G so that a "slider" is selected as the ball type will be described as one example. In the ball type screen shown in FIG. 5, the fact that a "slider" has been selected as the ball type is indicated by an alteration in the display (color, pattern, flashing or the like) of the left arrow among the ball type and pickoff base selection arrows CBV, and by the display of "slider", which is the selected ball type, above the left arrow among the ball type and pickoff base selection arrows CBV.

Figure 6:
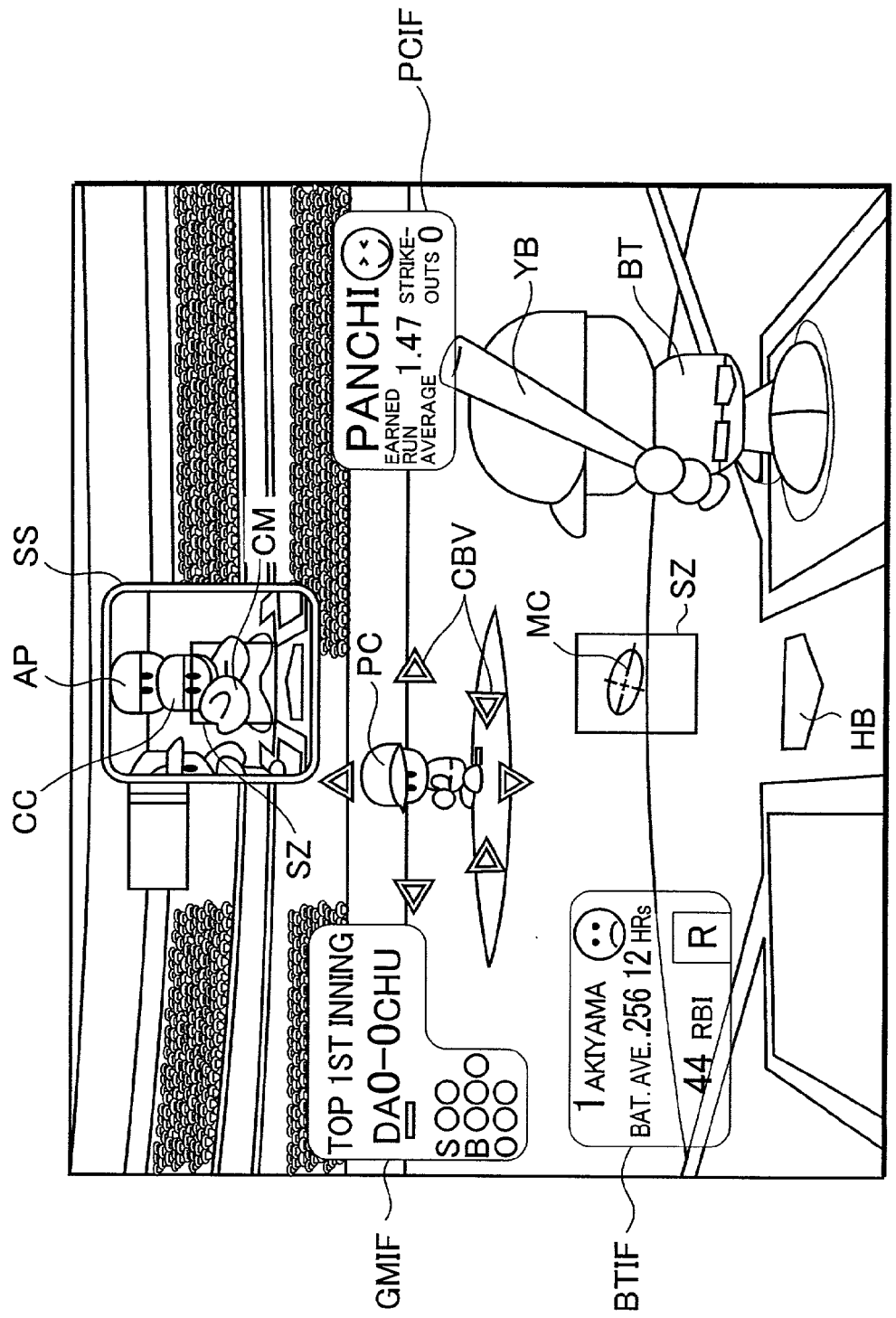
FIG. 6 shows the competition screen that is displayed on the monitor of the game system.
Figure 7:
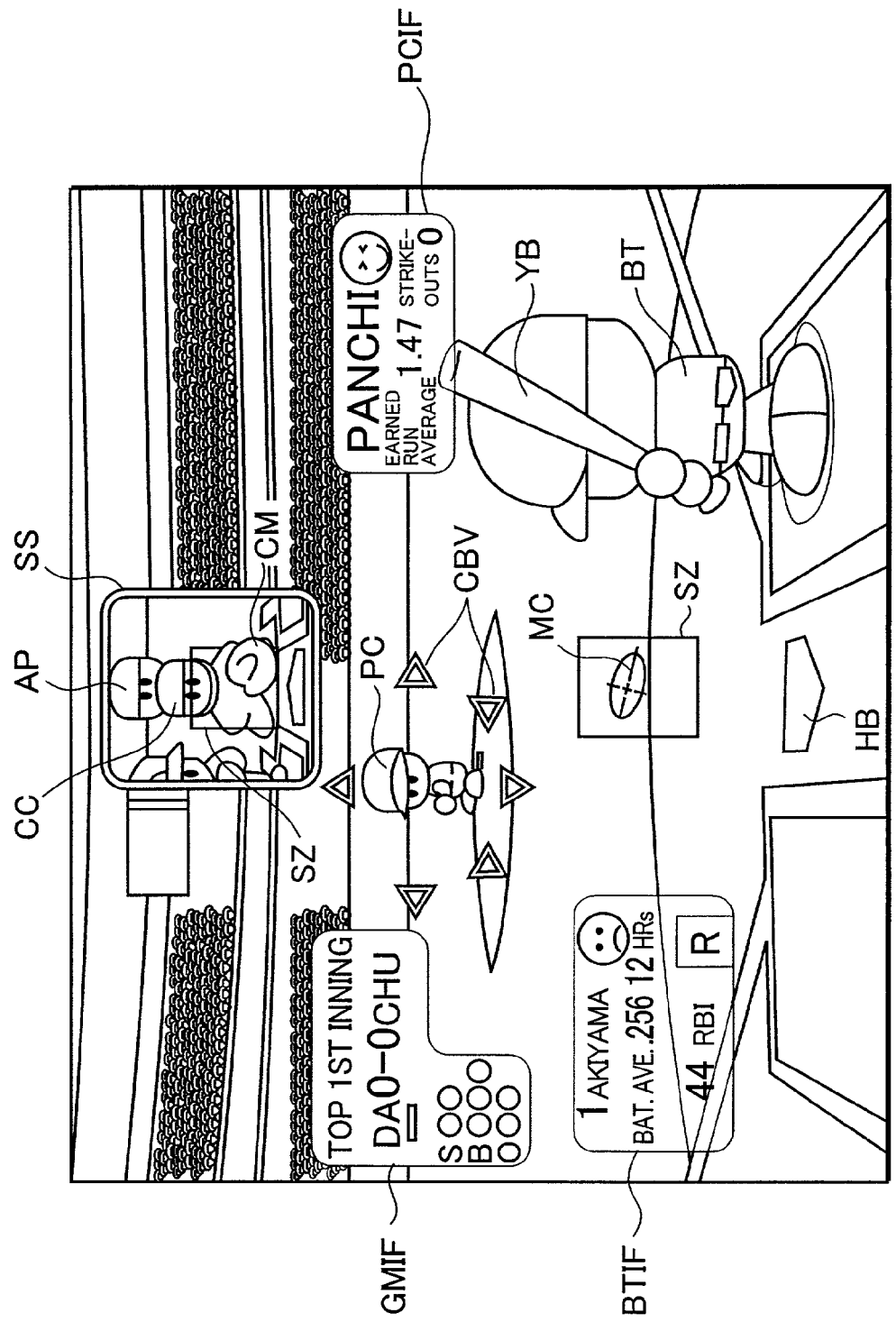
FIG. 7 shows the competition screen that is displayed on the monitor of the game system.
Figure 8:
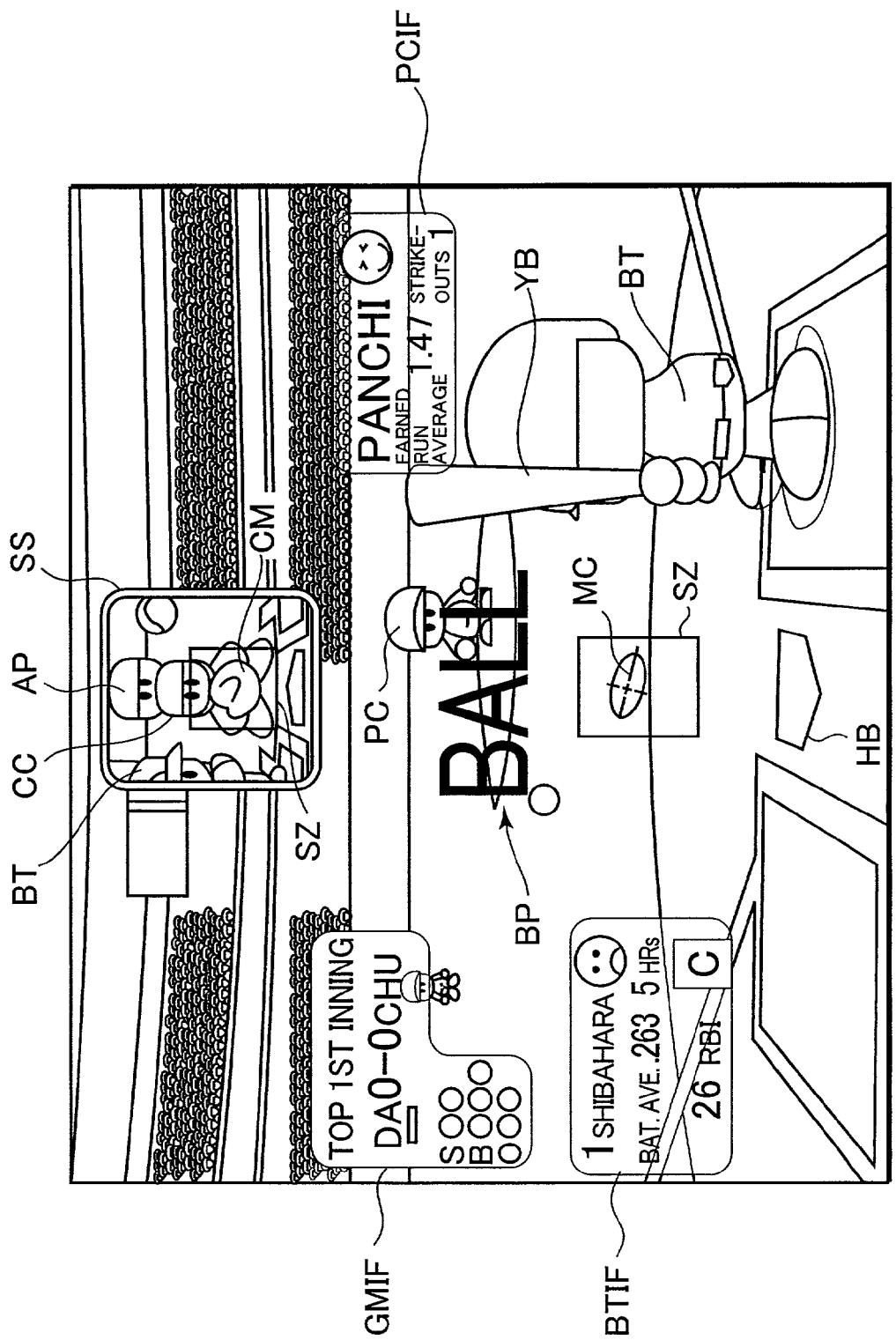
FIG. 8 shows the ball screen that is displayed on the monitor of the game system.

Next, a judgment is made as to whether or not an instruction to the pitcher character PC to initiate pitching has been made by the player using the pointing device such as a mouse or the like (ST11). In cases where such an instruction to initiate pitching has been made, the processing proceeds to step ST13. In cases where such an instruction to initiate pitching has not been made, the processing returns to step ST3. Here, the instruction to initiate pitching is accomplished by clicking the left button of the mouse. If an instruction to initiate pitching (clicking of the left button of the mouse) is performed in step ST11, the pitcher character PC initiates the pitching action (pitching motion). Then, an instruction selecting the course of the pitch is sent to the pitcher character PC by the player using the pointing device such a mouse or the like (ST13). Here, a case in which an instruction selecting the course of the pitch is accomplished by the moving operation of the mouse will be described with reference to FIGS. 6 and 7. The selection of the course of the pitch is accomplished by moving the catcher's mitt character CM shown in the small screen SS in accordance with the direction of movement and amount of movement of the mouse. For example, when the mouse is moved to the lower right as seen from above, the catcher's mitt character CM moves to the lower right (FIG. 6). On the other hand, when the mouse is moved to the upper left as seen from above, the catcher's mitt character CM moves to the upper left (FIG. 7). Since the course of the pitch can be selected by the moving operation of the mouse, the course of the pitch desired by the player can be selected quickly and easily. Furthermore, the time during which the catcher's mitt character CM can be moved is set as a specified time period extending from the time at which the instruction to initiate pitching is sent in step ST11 to the time at which the ball character BA is pitched by the pitcher character PC.

The ball character BA is pitched by the pitcher character PC (ST15) after a specified period of time has elapsed following the time at which an instruction to initiate pitching was sent to the pitcher character PC in step ST11. Next, a judgment is made as to whether or not the batter character BT has swung the bat character BY (ST17). In cases where the batter character BT has swung the bat character BY, the result (strike, foul, hit, out, home run or the like) is judged (ST19).

Figure 9:
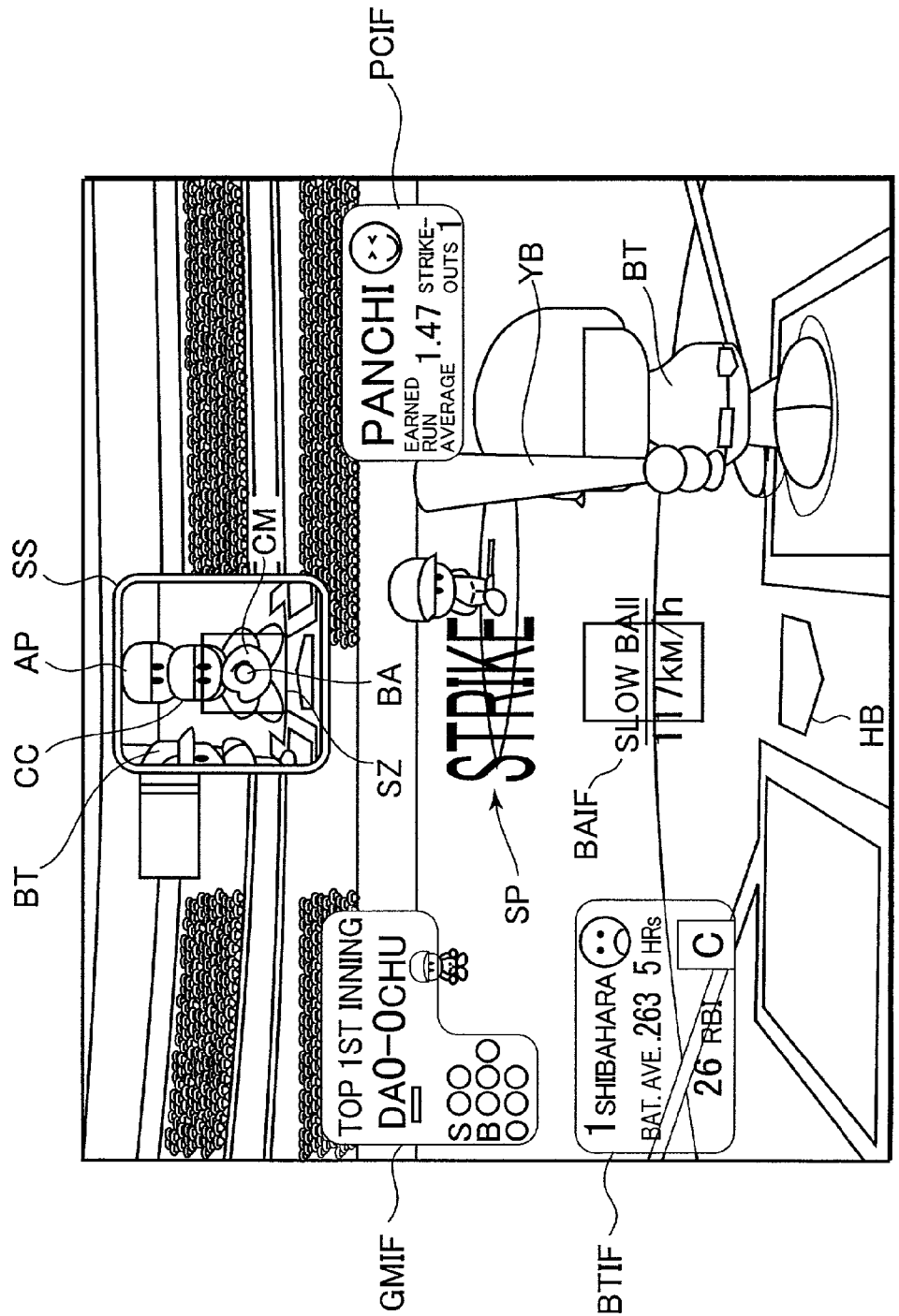
FIG. 9 shows the strike screen that is displayed on the monitor of the game system.
Figure 10:
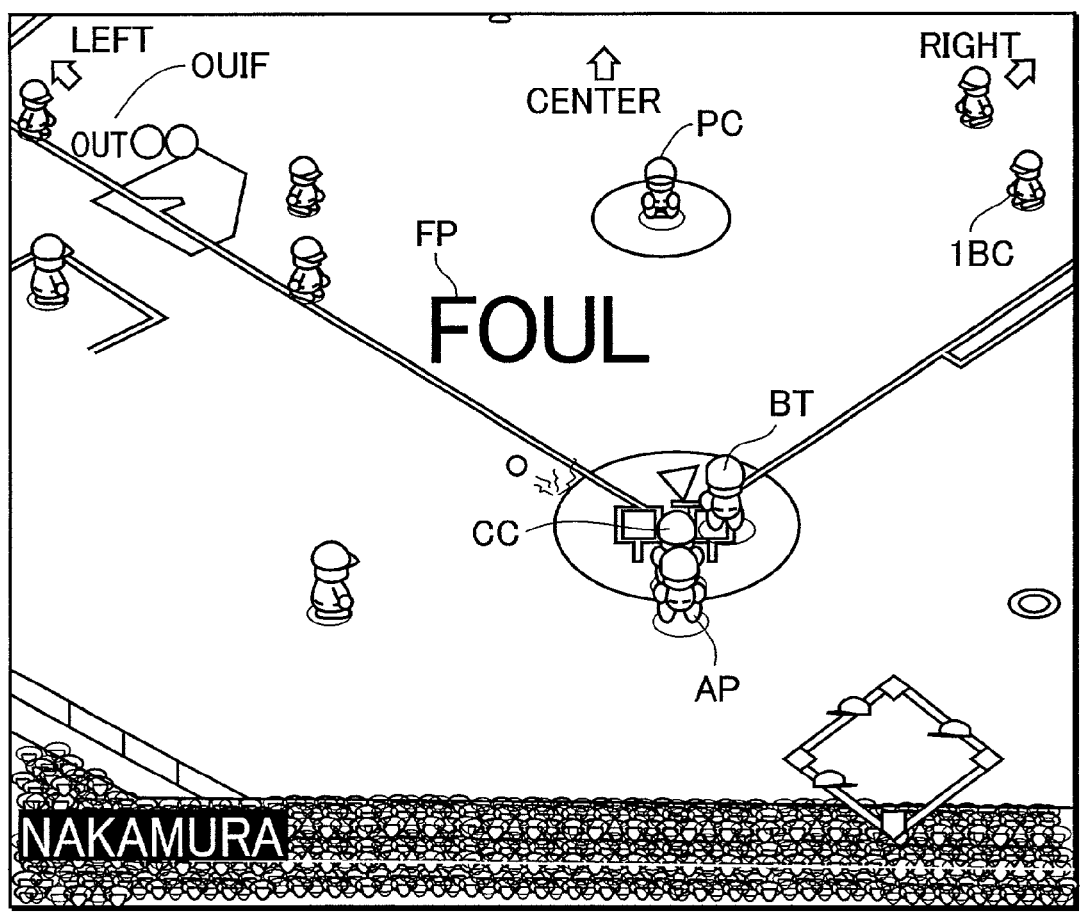
FIG. 10 shows the foul screen that is displayed on the monitor of the game system.

Then, a judgment is made as to whether or not the judgment result obtained in step ST19 was a strike (ST21). In cases where the result was a strike, the strike screen shown in FIG. 9 is displayed (ST23), and the processing is returned. In this strike screen, a strike display SP indicating that the current result was a "strike" is displayed in the center of the screen, and the ball type and speed of the ball pitched by the current pitcher character PC are displayed in a pitch content display part BAIF inside the strike zone SZ. In cases where the judgment result obtained in step ST19 was not a strike, a judgment is made as to whether or not the result was a foul (ST25). In cases where the result was a foul, the foul screen shown in FIG. 10 is displayed (ST27), and the processing is returned. In the foul screen, a foul display FP indicating that the current result was a "foul" is displayed in the center of the screen, and the current out count is displayed in an out count display part OUIF on the upper left portion of he screen. In cases where the result was not a foul, a judgment is made as to whether or not the judgment result obtained in step ST19 was an out (ST29).

Figure 11:
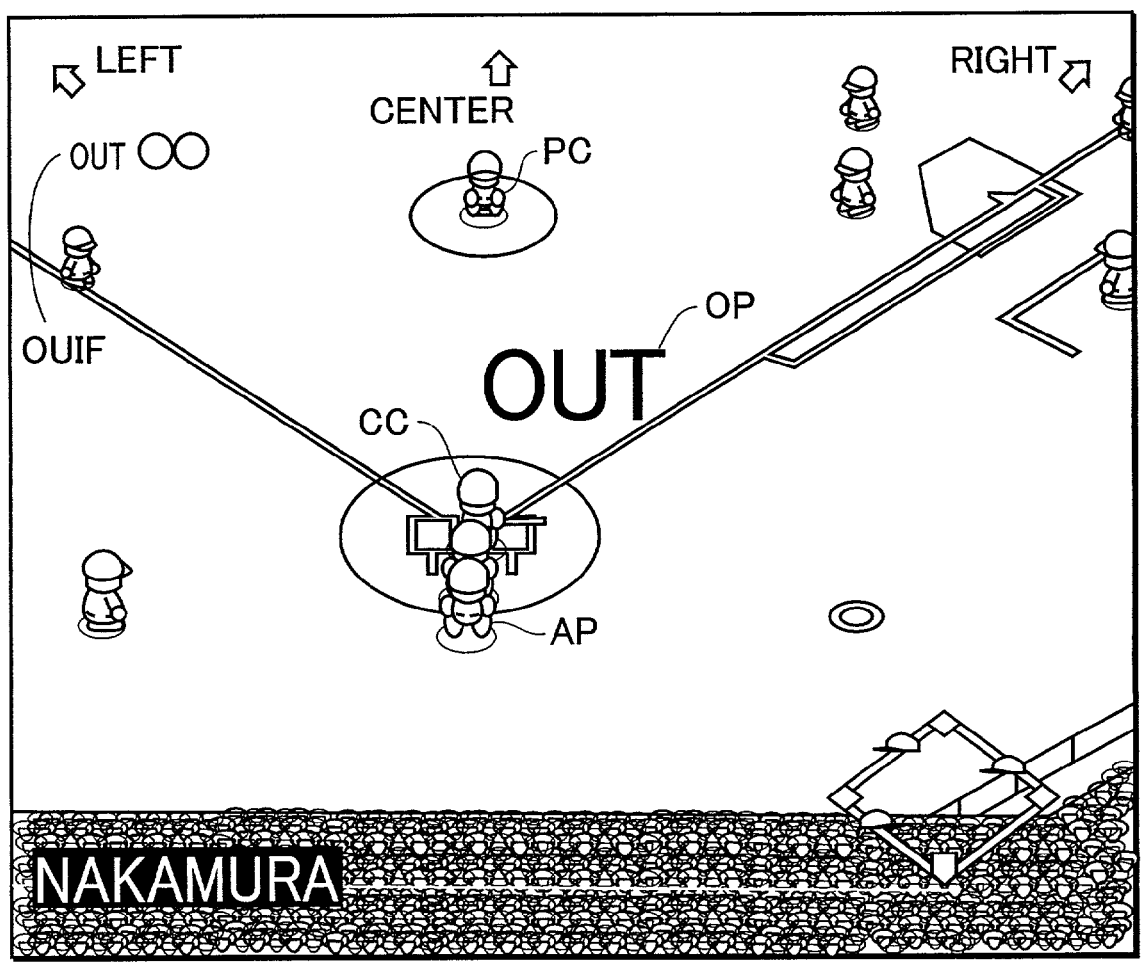
FIG. 11 shows the out screen that is displayed on the monitor of the game system.
Figure 12:
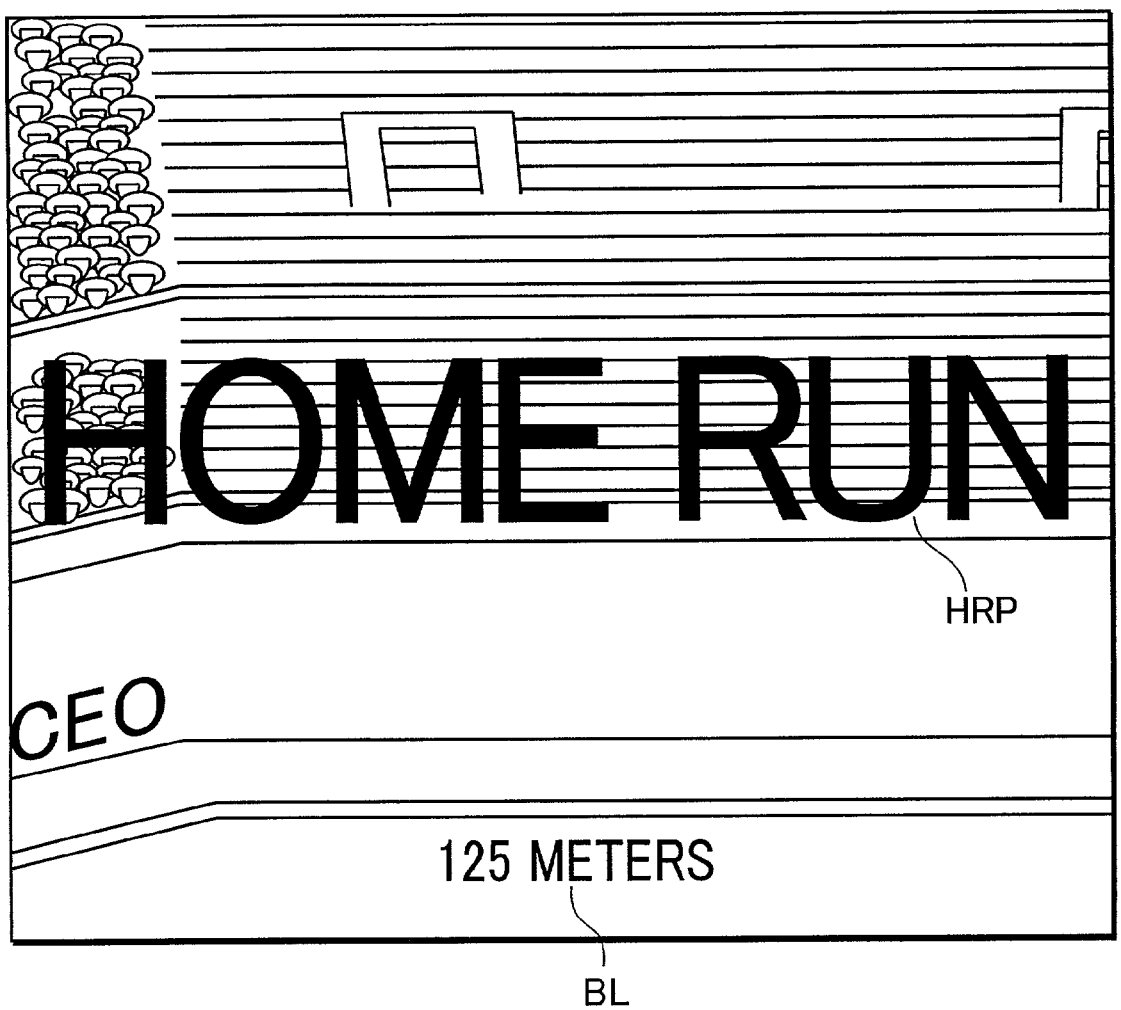
FIG. 12 shows the home run screen that is displayed on the monitor of the game system.
Figure 13:
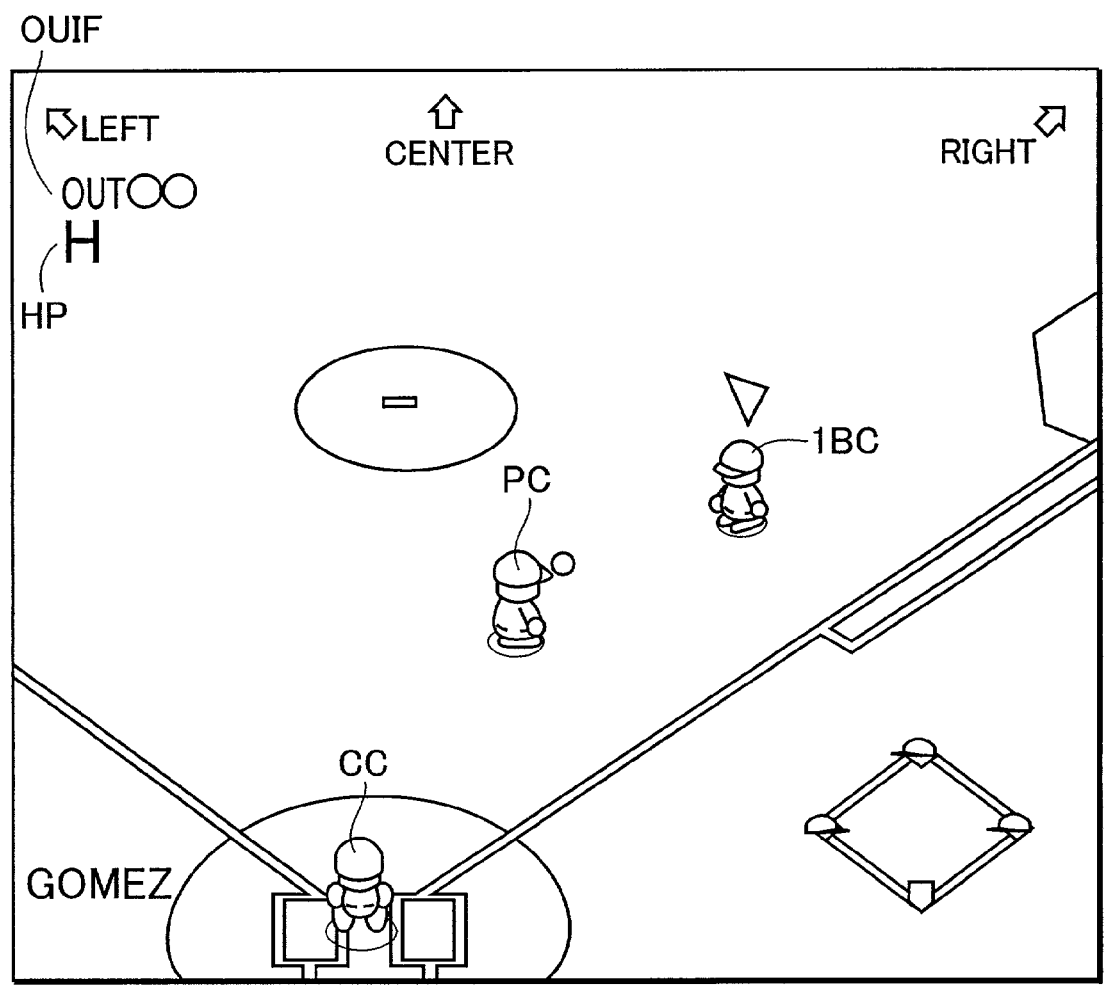
FIG. 13 shows the hit screen that is displayed on the monitor of the game system.

In cases where the result was an out, the out screen shown in FIG. 11 is displayed (ST31), and the processing is returned. In the out screen, an out display OP indicating that the current result was an "out" is displayed in the center of the screen, and the current out count (the out count following counting up by 1 according to the current result) is displayed in the out count display part OUIF on the upper left portion of the screen. In cases where the result was not a foul, a judgment is made as to whether or not the judgment result obtained in step ST19 was a home run (ST33). In cases where the result was a home run, the home run screen shown in FIG. 12 is displayed (ST35), and the processing is returned. In the home run screen, a home run display HRP indicating that the current result was a "home run" is displayed in the center of the screen, and the travel distance is displayed in a travel distance display BL on the lower central portion of the screen. In cases where the result was not a home run, the hit screen shown in FIG. 13 is displayed (ST37), and the processing is returned. In the hit screen, a hit display HP indicating that the current result was a "hit" is displayed on the upper left portion of the screen, and the current out count is displayed in the out count display part OUIF above the hit display HP.

In cases where pickoff throw is selected in step ST3, the base that is the object of pickoff throw (first base, second base or third base) is selected by the player using the pointing device such as a mouse or the like (ST43).

Figure 16:
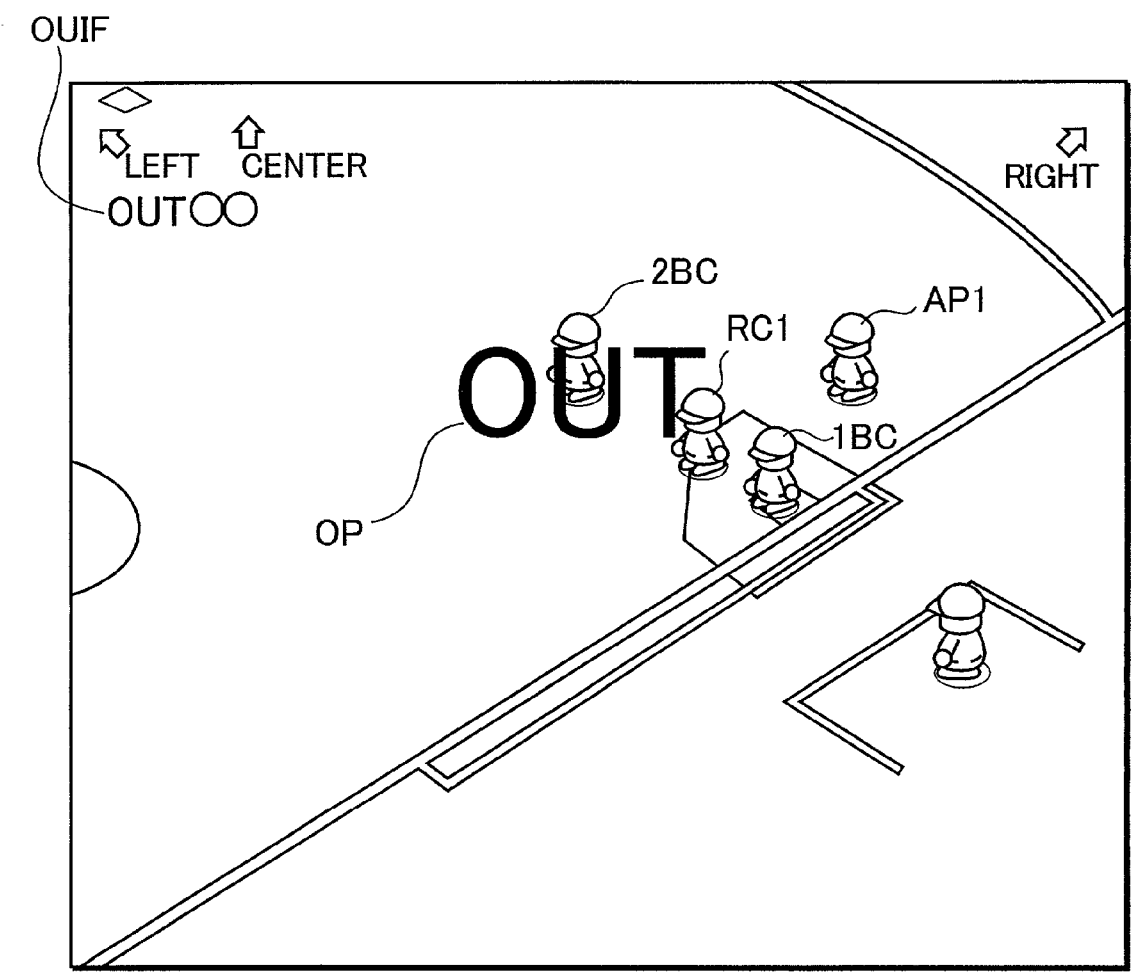
FIG. 16 shows the pickoff throw out screen that is displayed on the monitor of the game system.
Figure 17:
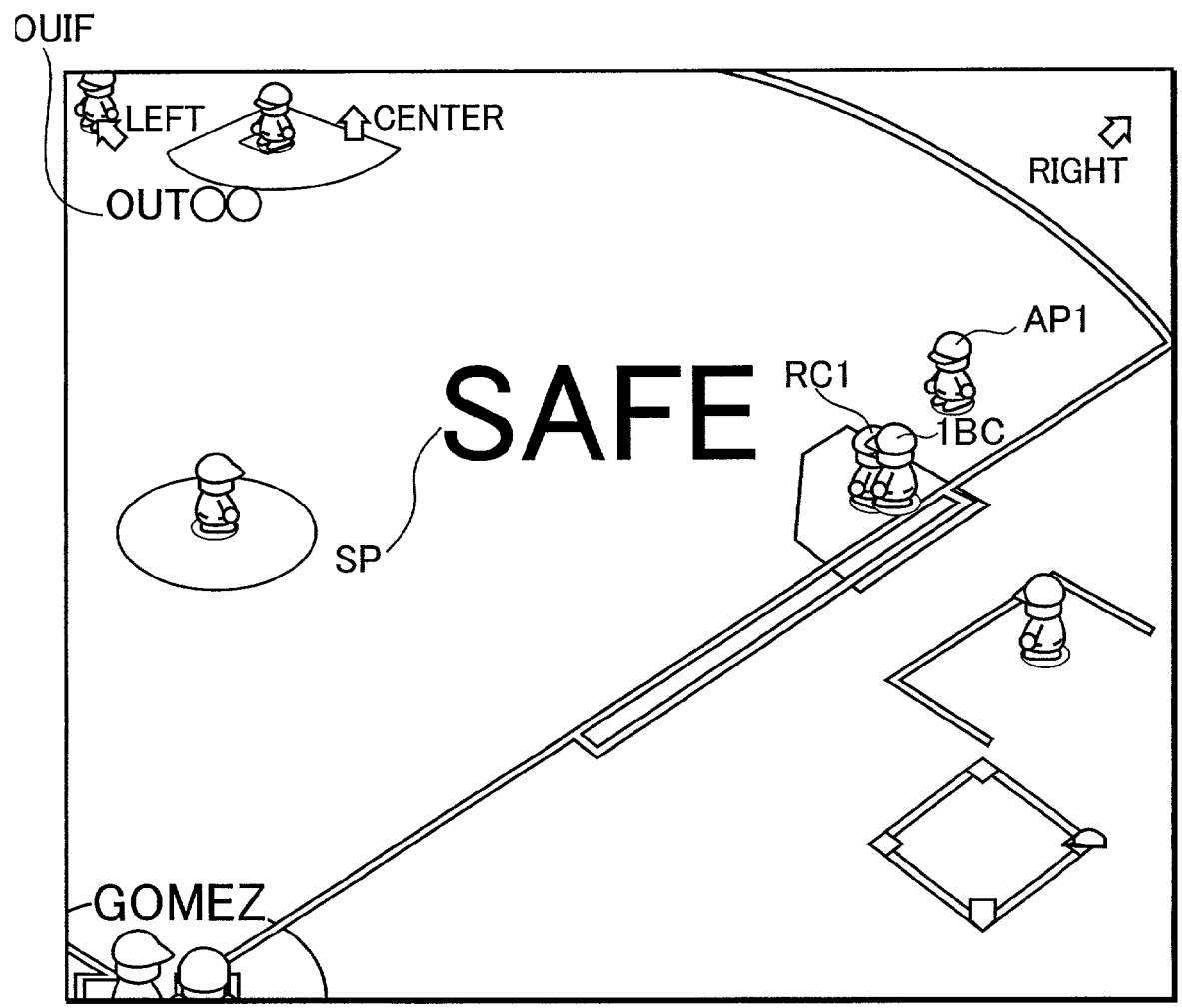
FIG. 17 shows the pickoff throw safe screen that is displayed on the monitor of the game system.

Furthermore, in cases where it is judged in step ST5 that a runner is present on the selected base, a judgment is made as to whether or not an instruction to initiate the pickoff throw action has been sent to the pitcher character PC by the player using the pointing device such as a mouse or the like (ST47). Here, such an instruction is designated by the simultaneous clicking of the left and right buttons of the mouse. In cases where such an instruction to initiate a pickoff throw action (i. e., simultaneous clicking of the left and right buttons of the mouse) has not be performed, the processing returns to step ST7. In cases were an instruction to initiate a pickoff throw action (i. e., simultaneous clicking of the left and right buttons of the mouse) was performed, a judgment is made as to whether or not the result of this pickoff throw was an out (ST49). The judgment made in step ST49 as to whether or not the result of the pickoff throw was an out is accomplished on the basis of the distance between the runner character RC and the base at the timing of the instruction to initiate a pickoff throw action that was performed in step ST47. In cases where the result of this pickoff throw was an out, the successful pickoff screen shown in FIG. 16 is displayed (ST51), and the processing returns to step ST1. In the successful pickoff screen, an out display OP indicating that the current result was an "out" is displayed in the center of the screen, and the current out count (the out count following counting up by 1 according to the current result) is displayed in the out count display part OUIF on the upper left portion of the screen. In cases where the result was not an out (i. e., in cases where the result was safe), the unsuccessful pickoff screen shown in FIG. 17 is displayed (ST53), and the processing returns to step ST1. In the unsuccessful pickoff screen, a safe display SP indicating that the current result was "safe" is displayed in the center of the screen, and the current out count is displayed in the out count display part OUIF on the upper left portion of the screen.

Figure 18:
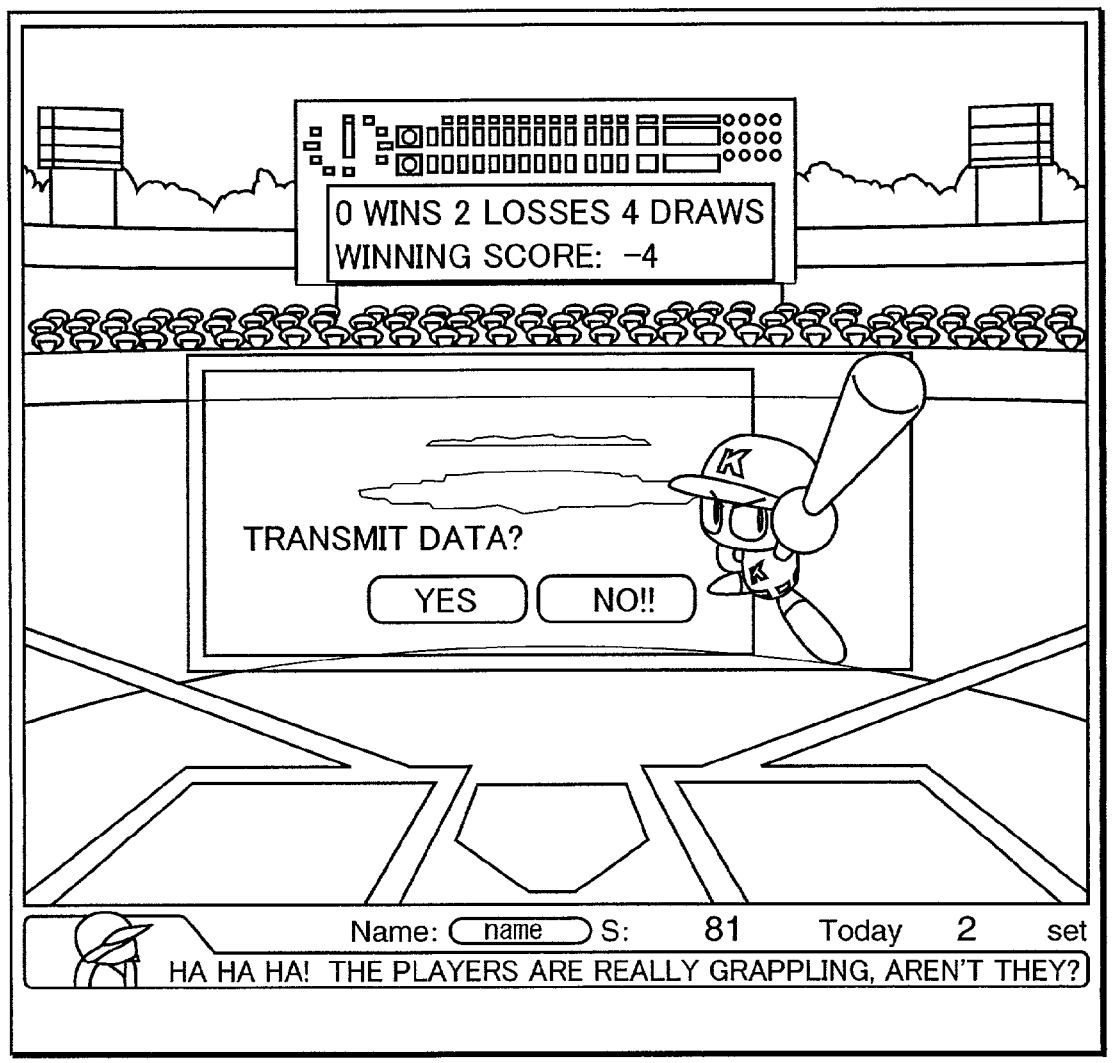
FIG. 18 shows the data transmission screen that is displayed on the monitor of the game system.

Thus, the baseball game proceeds according to the flow chart shown in FIG. 2 as described above, and when 9 innings are completed (when the table for 9 innings ends in a case where the final offensive team is winning), a data transmission screen of the type shown in FIG. 18 is displayed. Here, if the "yes" button is clicked, the contents of the game results (i.e., the "winning score" of the player's team), the contents of pitching results such as the number of times that pitching was performed by the pitcher characters PC of the player's team, the ERAs of these pitcher characters PC and the like, and the contents of batting results such as the batting averages, numbers of home runs and the like of the batter characters BT of the player's team, are transmitted to the server 16 from the computer 14. Furthermore, the "winning score" of the player's team, the pitching results for the pitcher characters PC of the player's team, the batting results for the batter characters BT of the player's team and the like are calculated beforehand on the side of the computer 14; here, however, the storage of such data is handled by the server 16.

In the server 16, meanwhile, the "winning score" data transmitted from the respective computers 14 is stored in the memory unit 42, and (for example) a ranking is performed by tabulating the data in weekly units or monthly units. The ranking results are transmitted to the respective computers 14, either automatically or in response to requests from the players.

Figure 19:
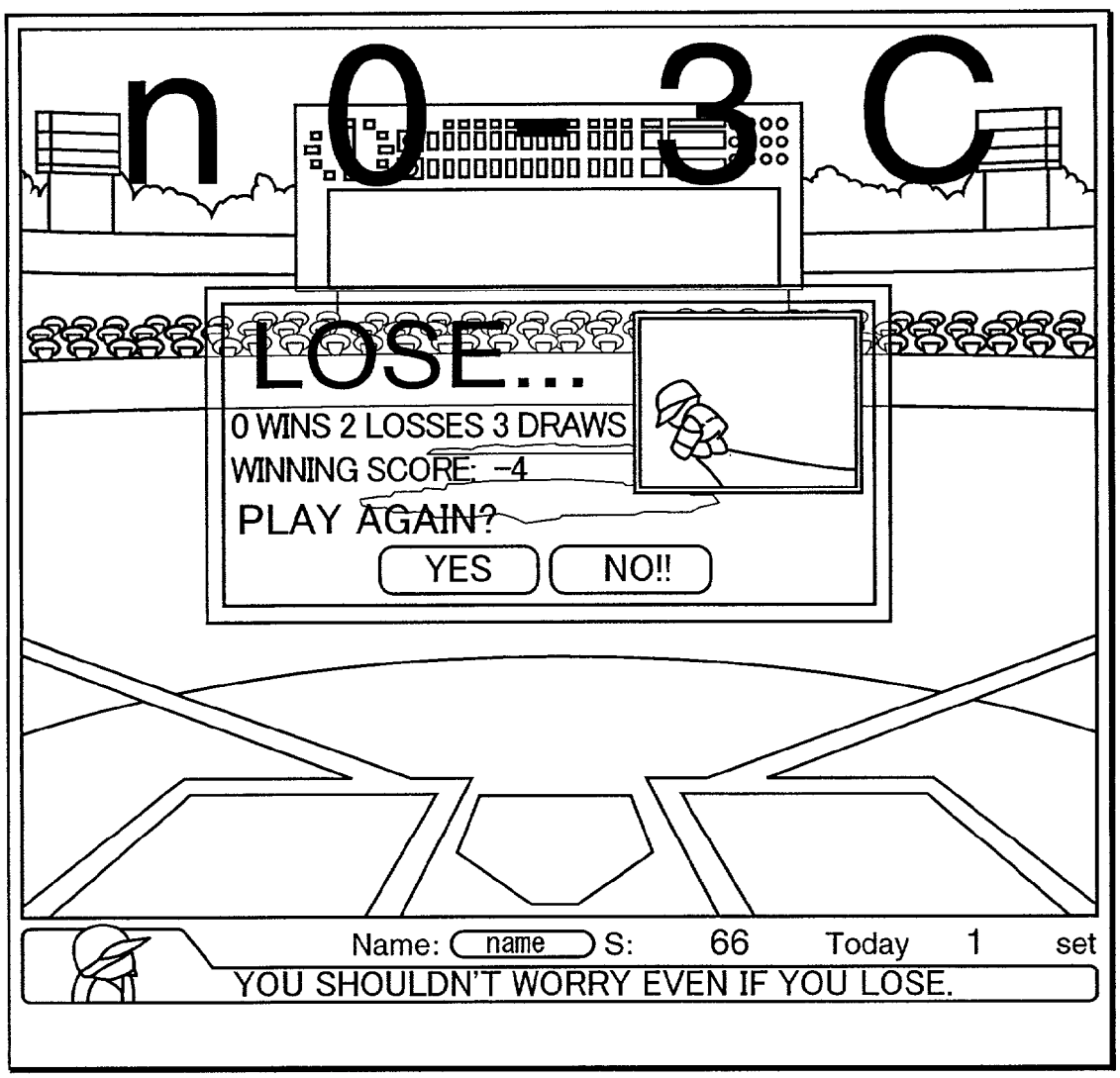
FIG. 19 shows the game continuation screen that is displayed on the monitor of the game system.

Furthermore, a game continuation screen such as that shown in FIG. 19 is displayed prior to the display of the data transmission screen, and an inquiry is made as to whether or not the player wishes to continue and play the game again. If "yes" is selected, the game can be replayed; if "no" is selected, the game ends. In cases where the player lost the preceding game, "LOSE" is displayed, in cases where the player won, "WIN" is displayed, and in cases where the game was a draw, "DRAW" is displayed.

Thus, in the present embodiment, the player can control the actions of the pitcher character PC by means of a mouse 22 while playing a baseball game. Accordingly, the selection of pickoff throw or pitching, the selection of various ball types and the course of the pitch, and the selection of the base that is to be picked off, can be performed quickly and easily, so that the player can perform desired pitching actions. Furthermore, since computers 14 which have a broad user stratum are used, and the system is devised so that the results of baseball games played using respective computers 14 on the basis of a competition program that is distributed directly or indirectly from a server 16 are controlled in a concentrated manner by the server 16, with rankings being displayed as a result, a game environment that allows the participation of numerous persons can easily be constructed. Furthermore, since persons participating in the baseball game can easily understand their own results relative to the overall group, an incentive for continuing the game can be provided. Moreover, since competition values are obtained in cases where certain fixed conditions are met, this also provides an incentive for continuing the game.

Furthermore, the present invention may also adopt the following configurations:

(A) In the present embodiment, a case in which a mouse 22 was used as the pointing device was described. However, a configuration using a portable tracking ball, portable slide pad or similar pointing device which allows the simultaneous input of the direction of displacement and amount of displacement of a pointer by means of a single operation performed by the player, and which allows the input of signals at the same timing as that of this operation, may also be used.

(B) In the present embodiment, a case was described in which pickoff throw was selected when the left and right buttons of the mouse were simultaneously clicked, and pitching was selected when the left button of the mouse was clicked. However, a configuration in which the selection of pickoff throw or pitching is selected by a different operation with respect to the left and right buttons is also possible.

(C) In the present embodiment, the judgment of the results in a case were pickoff throw was selected was accomplished on the basis of the distance between the runner character RC and the base. However, a configuration in which this judgment is made with the ability parameters of the pitcher character also being taken into account is also possible. In such a case, since the result of pickoff throw is affected by the ability parameters of the pitcher character, the interest of the game is heightened.

(D) In the present embodiment, a case was described in which the selection of pitching or pickoff throw was performed following the selection of the ball type and the base to be picked off; however, a configuration in which the selection of pitching or pickoff throw is performed prior to the selection of the ball type and base to be picked off is also possible. In such a case, a clear distinction is made between the selection of the ball type and the selection of the base that is to be picked off. Specifically, in cases where pitching is selected, the ball type is selected by the moving operation of the pointing device, and in cases where pickoff throw is selected, the base that is to be picked off is selected by the moving operation of the pointing device. Accordingly, the operating procedure is more easily understood, so that even a beginner can easily operate the game.

(E) In the present embodiment, the server and personal computers were connected; however, a configuration in which the personal computers are in a stand-alone state is also possible. In such cases, there is no need for a server or data transfer.

In summary, one aspect of the present invention relates to a computer readable recording medium in which a game progress control program is recorded to control a progress of a baseball game in which a game player's team and a computer-controlled team or competitor's team alternately play offense and defense via a ball character used as a game medium. The game progress control program comprises the steps of: displaying a game image including a plurality of characters on a monitor screen of a computer; receiving input of the content of instructions based on the moving operations and button operations of the player with respect to a pointing device; and proceeding the baseball game based on the input made by the game player; wherein in said receiving step, the designation of instructions for the pitching action of a pitcher character is accomplished by the operation of said pointing device when the player's team is the defensive side, the designation of instructions for the offensive action of a batter character is accomplished by the operation of said pointing device when the game player's team is the offensive side, and the selection of pitching or pickoff throw as said pitching action is accomplished by a button operation of said pointing device. The another aspect of the present invention relates to a game progress control method for controlling a progress of a baseball game in which a game player's team and a computer-controlled team or competitor's team alternately play offense and defense via a ball character used as a game medium. The game progress control method comprises the steps of: displaying a game image including a plurality of characters on a monitor screen of a computer; receiving input of the content of instructions based on the moving operations and button operations of the player with respect to a pointing device; and proceeding the baseball game based on the input made by the game player; wherein in said receiving step, the designation of instructions for the pitching action of a pitcher character is accomplished by the operation of said pointing device when the player's team is the defensive side, the designation of instructions for the offensive action of a batter character is accomplished by the operation of said pointing device when the game player's team is the offensive side, and the selection of pitching or pickoff throw as said pitching action is accomplished by a button operation of said pointing device.

In the aforementioned aspects of the invention, the player's team and a computer-controlled team or competitor's team alternately play offense and defense via a ball character used as a game medium so that a baseball game is caused to proceed; here, the designation of instructions for the pitching action of the pitcher character is accomplished by the operation of the aforementioned pointing device when the player's team is the defensive side, and the designation of instructions for the offensive action of the batter character is accomplished by the operation of the aforementioned pointing device when the player's team is the offensive side. Accordingly, a baseball game can be realized in an environment that is difficult to achieve in the case of game-dedicated devices and the joysticks used in such devices. Furthermore, the selection of pitching or pickoff throw as the aforementioned pitching action is accomplished by the button operation of the aforementioned pointing device; accordingly, this pitching action is diversified so that the ability to plan the game is improved.

In the aforementioned game progress control program, the pointing device preferably has at least two buttons, namely a first button and a second button, and the selection of pitching or pickoff throw is accomplished by performing different button operations with respect to the aforementioned first button and second button. In the above program, the selection of pitching or pickoff throw is accomplished by performing different button operations with respect to the first button and second button; accordingly, the selection of pitching or pickoff throw can be accomplished quickly and easily, so that the ability to plan the game is improved.

In the game progress control program, the designation of instructions for the type of ball is preferably accomplished by the moving operation of the pointing device in cases where pitching is selected as the pitching action of the aforementioned pitcher character.

In the game progress control program, the designation of instructions for the course of the pitch is preferably accomplished by the moving operation of the pointing device in cases where pitching is selected as the pitching action of the aforementioned pitcher character.

In the game progress control program, the operation designating instructions for the course of the pitch is preferably received after the pitching action of the pitcher character is initiated. In the above program, since the operation designating instructions for the aforementioned course of the pitch is received after the pitching action of the pitcher character is initiated, the timing of the operation designating instructions for the course of the pitch is restricted, so that the tension felt by the player is heightened.

In the game progress control program, the designation of the base that is to be picked off is preferably accomplished by the moving operation of the pointing device in cases where pickoff throw is selected as the pitching action of the aforementioned pitcher character. In the aforementioned program, since the designation of the base that is to be picked off is accomplished by the moving operation of the aforementioned pointing device, the base that is to be picked off can be designated quickly and easily, so that the ability to plan the game is improved.

In the game progress control program, parameters that define respective abilities are set in the pitcher character of the aforementioned player's team, and these parameters are altered in accordance with the pitching results. In the above program, the ability of the pitcher character can be altered by altering parameters in accordance with the pitching results. Accordingly, the baseball game is rich in variation, and is therefore superior in terms of interest.

In addition, another aspect of the invention relates to a game server which can be accessed from a computer operated by the player via a network, and which has a computer readable recording medium on which any one of the forms of the aforementioned game progress control programs is recorded. The aforementioned server makes it possible to enjoy a baseball game using the game progress control program rich in interest as a competition with the server control or competition with another player via a network.

This application is based on Japanese Patent Application Serial No. 2001-031895 filed in Japanese Patent Office on Feb. 08, 2001; the contents of which are hereby incorporated by reference.

Although the present invention has been fully described by way of example with reference to the accompanying drawings, it is to be understood that various changes and modifications will be more apparent to those skilled in the art. Therefore, unless otherwise such changes and modifications depart from the scope of the present invention hereinafter defined, they should be construed as being included therein.

What is claimed is:

1. A computer readable recording medium in which an executable game progress control program is recorded to control a progress of a baseball game in which a game player's team and a computer-controlled team or competitor's team alternately play offense and defense using a ball character, said game progress control program comprising the steps of:

displaying a game image including a plurality of characters on a monitor screen of a computer;

receiving input of instructions based on directional moving operations, which input a movement direction as input, and depression operations of a pointing device by the player, said pointing device in its entirety being movable with respect to said monitor screen, and proceeding the baseball game based on the input made by the game player;

wherein in said receiving step:

designation of instructions for a pitching action of a pitcher character is accomplished by the operation of said pointing device when the player's team is the defensive side, designation of instructions for offensive action of a batter character is accomplished by operation of said pointing device when the game player's team is the offensive side, and selection and effectuation of a pitching throw or a pickoff throw as said pitching action is accomplished by conversion of a directional moving operation of the pointing device common to both the pitching throw and the pickoff throw, the selection and effectuation of the pitching throw and the pickoff throw being accomplished by the following ordered combination of player inputs:

a first input operation of the pointing device which is the directional moving operation of said pointing device inputting a movement direction as input which is common to effectuation of both the pitching throw and the pickoff throw; and a second input operation of the pointing device, which is one of two different depression operations on said pointing device, wherein:

when the second input operation is a first depression operation of the two different depression operations, the movement direction of the first input operation is converted to an effectuation command to effectuate the pitching throw; and when the second input operation is a second depression operation of the two different depression operations, the movement direction of the first input operation is converted to an effectuation command to effectuate the pickoff throw; and designation of a base that is to be picked off is accomplished by the directional moving operation of said first input operation of said pointing device when the player's team is the defensive side.

2. The computer recording medium according to claim 1, wherein said pointing device has a first button and a second button for accepting said depression operations, and said two different depression operations are accomplished by performing different button operations with respect to said first button and second button.

3. The computer recording medium according to claim 1, wherein designation of instructions for the pitching indicating a type of pitch is accomplished by the directional moving operation of said pointing device in cases where pitching is selected as the pitching action of said pitcher character.

4. The computer recording medium according to claim 1, wherein designation of instructions for a course of the pitch is accomplished by the directional moving operation of said pointing device in cases where pitching is selected as the pitching action of said pitcher character.

5. The computer recording medium according to claim 4, wherein the operation designating instructions for said course of the pitch is received after the pitching action of the pitcher character is initiated.

6. The computer recording medium according to claim 1, wherein parameters that define respective abilities are set in the pitcher character of said player's team, and these parameters are altered in accordance with the pitching results.

7. The computer recording medium according to claim 1, wherein:

said depression operation of said pointing device are input via a first button and a second button;

said directional moving operation of said first input operation of the pointing device is taken as the pitching instruction to the pitcher character when the first button is depressed by the game player as said second input operation after said directional moving operation of the pointing device is accomplished in said receiving step; and said directional moving operation of said first input operation of the pointing device is taken as the instruction of the pickoff throw where the base to which the pickoff throw is to be made when both the first and the second buttons are depressed by the game player as said second input operation after said directional moving operation of the pointing device is accomplished in said receiving step.

8. A game server which is accessible from a computer operated by a player via a network, and which has a computer readable recording medium on which an executable game progress control program is recorded to control a progress of a baseball game in which a game player's team and a computer-controlled team or competitor's team alternately play offense and defense using a ball character, said game progress control program comprising the steps of:

displaying a game image including a plurality of characters on a monitor screen of a computer;

receiving input of instructions based on directional moving operations, which input a movement direction as input, and depression operations of a pointing device by the player, said pointing device in its entirety being movable with respect to said monitor screen, and proceeding the baseball game based on the input made by the game player;

wherein in said receiving step:

designation of instructions for a pitching action of a pitcher character is accomplished by the operation of said pointing device when the player's team is the defensive side, designation of instructions for offensive action of a batter character is accomplished by operation of said pointing device when the game player's team is the offensive side, and selection and effectuation of a pitching throw or a pickoff throw as said pitching action is accomplished by conversion of a directional moving operation of the pointing device common to both the pitching throw and the pickoff throw, the selection and effectuation of the pitching throw and the pickoff throw being accomplished by the following ordered combination of player inputs:

a first input operation of the pointing device which is the directional moving operation of said pointing device inputting a movement direction as input which is common to effectuation of both the pitching throw and the pickoff throw; and a second input operation of the pointing device, which is one of two different depression operations on said pointing device, wherein:

when the second input operation is a first depression operation of the two different depression operations, the movement direction of the first input operation is converted to an effectuation command to effectuate the pitching throw; and when the second input operation is a second depression operation of the two different depression operations, the movement direction of the first input operation is converted to an effectuation command to effectuate the pickoff throw; and designation of a base that is to be picked off is accomplished by the directional moving operation of said first input operation of said pointing device when the player's team is the defensive side.

9. A game progress control method for controlling a progress of a baseball game in which a game player's team and a computer-controlled team or competitor's team alternately play offense and defense using a ball character, said game progress control method comprising the steps of:

displaying a game image including a plurality of characters on a monitor screen of a computer;

receiving input of instructions based on directional moving operations, which input a movement direction as input, and depression operations of a pointing device by the player, said pointing device in its entirety being movable with respect to said monitor screen, and proceeding the baseball game based on the input made by the game player;

wherein in said receiving step:

designation of instructions for a pitching action of a pitcher character is accomplished by the operation of said pointing device when the player's team is the defensive side, designation of instructions for offensive action of a batter character is accomplished by operation of said pointing device when the game player's team is the offensive side, and selection and effectuation of a pitching throw or a pickoff throw as said pitching action is accomplished by conversion of a directional moving operation of the pointing device common to both the pitching throw and the pickoff throw, the selection and effectuation of the pitching throw and the pickoff throw being accomplished by the following ordered combination of player inputs:

a first input operation of the pointing device which is the directional moving operation of said pointing device inputting a movement direction as input which is common to effectuation of both the pitching throw and the pickoff throw; and a second input operation of the pointing device, which is one of two different depression operations on said pointing device, wherein:

when the second input operation is a first depression operation of the two different depression operations, the movement direction of the first input operation is converted to an effectuation command to effectuate the pitching throw; and when the second input operation is a second depression operation of the two different depression operations, the movement direction of the first input operation is converted to an effectuation command to effectuate the pickoff throw; and designation of a base that is to be picked off is accomplished by the directional moving operation of said first input operation of said pointing device when the player's team is the defensive side.

10. A computer readable recording medium in which an executable game progress control program is recorded to control a progress of a baseball game in which a game player's team and a computer-controlled team or competitor's team alternately play offense and defense using a ball character, said game progress control program comprising the steps of:

displaying a game image including a plurality of characters on a monitor screen of a computer;

receiving input of instructions based on directional moving operation and button operation of a mouse with a first button and a second button by the player; and proceeding the baseball game based on the input made by the game player;

wherein in said receiving step:

designation of instructions for a pitching action of a pitcher character is accomplished by the operation of said mouse when the player's team is the defensive side, designation of instructions for offensive action of a batter character is accomplished by operation of said mouse when the game player's team is the offensive side, and selection and effectuation of a pitching throw or a pickoff throw as said pitching action is accomplished by conversion of a directional moving operation of the pointing device common to both the pitching throw and the pickoff throw, the selection and effectuation of the pitching throw and the pickoff throw being accomplished by the following ordered combination of player inputs:

a first input operation of the pointing device which is the directional moving operation of said pointing device inputting a movement direction as input which is common to effectuation of both the pitching throw and the pickoff throw; and a second input operation of the pointing device, which is a depression operation of a selected corresponding one of said first and said second buttons of the mouse, wherein:

when the second input operation is a first depression operation of said first button, the movement direction of the first input operation is converted to an effectuation command to effectuate the pitching throw; and when the second input operation is a second depression operation of said second button, the movement direction of the first input operation is converted to an effectuation command to effectuate the pickoff throw; and designation of a base that is to be picked off is accomplished by said directional moving operation of said first input operation of said mouse when the player's team is the defensive side.

11. A computer readable recording medium in which a game progress control program is recorded to control a progress of a baseball game in which a game player's team and a computer-controlled team or competitor's team alternately play offense and defense using a ball character, said game progress control program comprising the steps of:

displaying a game image including a plurality of characters on a monitor screen of a computer;

receiving input of instructions based on directional moving operations and button operations of the player with respect to a mouse with a first button and a second button; and proceeding the baseball game based on the input made by the game player;

wherein in said receiving step:

designation of instructions for a pitching action of a pitcher character is accomplished by operation of said mouse when the player's team is the defensive side, designation of instructions for the offensive action of a batter character is accomplished by operation of said mouse when the game player's team is the offensive side, the designation of instructions for the pitching action includes selection and effectuation of a pitching throw or a pickoff throw as said pitching action accomplished by conversion of a directional moving operation of the pointing device common to both the pitching throw and the pickoff throw, the selection and effectuation of the pitching throw and the pickoff throw being accomplished by the following ordered combination of player inputs a first input operation of the pointing device which is the directional moving operation of said pointing device inputting a movement direction as input which is common to effectuation of both the pitching throw and the pickoff throw; and a second input operation of the pointing device, which is a depression operation of a selected corresponding one of said first and said second buttons of the mouse, wherein:

when the second input operation is a first depression operation of said first button, the movement direction of the first input operation is converted to an effectuation command to effectuate the pitching throw; and when the second input operation is a second depression operation of said second button, the movement direction of the first input operation is converted to an effectuation command to effectuate the pickoff throw;

selection of a type of a pitch to be thrown as the pitching action from among a first pitch type, a second pitch type and a third pitch type is accomplished by said directional moving operation of said first input operation of the mouse being respectively to a right direction, a top direction, or a left direction followed by operation of one of the first and second buttons of the mouse; and selection of a base for a pickoff throw as said pitching action from among a throw to a first base, a second base, or a third base is accomplished by said directional moving operation of said first input operation of the mouse being respectively to a right direction, a top direction, or a left direction followed by operation of another one of the first and the second buttons of the mouse.

* * * * *